US012384179B2

(12) United States Patent
Nakata et al.

(10) Patent No.: US 12,384,179 B2
(45) Date of Patent: Aug. 12, 2025

(54) RECORDING APPARATUS

(71) Applicant: SEIKO EPSON CORPORATION, Tokyo (JP)

(72) Inventors: Satoshi Nakata, Matsumoto (JP); Masanari Tanaka, Shiojiri (JP); Tatsuya Ito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 119 days.

(21) Appl. No.: 18/185,128

(22) Filed: Mar. 16, 2023

(65) Prior Publication Data

US 2023/0294437 A1 Sep. 21, 2023

(30) Foreign Application Priority Data

Mar. 17, 2022 (JP) ................................ 2022-042271

(51) Int. Cl.

*B41J 29/02* (2006.01)
*B41J 29/13* (2006.01)
*B41J 2/175* (2006.01)

(52) U.S. Cl.

CPC ............... *B41J 29/02* (2013.01); *B41J 29/13* (2013.01); *B41J 2002/17573* (2013.01)

(58) Field of Classification Search

CPC ... B41J 29/02; B41J 29/13; B41J 2002/17573
See application file for complete search history.

(56) References Cited

U.S. PATENT DOCUMENTS

| | | | |
|---|---|---|---|
| 2006/0082622 A1 | 4/2006 | Yonekawa et al. | |
| 2020/0247135 A1 | 8/2020 | Higuchi et al. | |
| 2020/0316955 A1 | 10/2020 | Yoshikawa et al. | |

FOREIGN PATENT DOCUMENTS

| | | | | |
|---|---|---|---|---|
| CN | 101842240 | | 9/2010 | |
| CN | 207955026 | | 10/2018 | |
| EP | 2368712 | A2 * | 9/2011 | .......... B41J 2/17513 |
| JP | 2004-142325 | A | 5/2004 | |
| JP | 2006-110946 | A | 4/2006 | |
| JP | 2017-104993 | | 6/2017 | |
| JP | 2019-166842 | A | 10/2019 | |
| JP | 2020-124878 | A | 8/2020 | |
| JP | 2020-168845 | A | 10/2020 | |
| WO | 2009/058709 | | 5/2009 | |

* cited by examiner

*Primary Examiner* — Justin Seo
(74) *Attorney, Agent, or Firm* — WORKMAN NYDEGGER

(57) ABSTRACT

A recording apparatus includes: a recording portion that performs recording by ejecting a liquid onto a medium; a liquid accommodation portion that accommodates the liquid to be ejected by the recording portion; and a housing that includes an accommodation portion exterior that accommodates the liquid accommodation portion, wherein the liquid accommodation portion includes a viewing region configured that the liquid accommodated is viewed, the accommodation portion exterior of the housing includes a viewing portion that faces the viewing region and is configured that the liquid is viewed, and a lighting portion that takes in light from outside the housing, and an optical path through which the light taken in passes is provided between the liquid accommodation portion and the accommodation portion exterior.

14 Claims, 20 Drawing Sheets

RECORDING APPARATUS

The present application is based on, and claims priority from JP Application Serial Number 2022-042271, filed Mar. 17, 2022, the disclosure of which is hereby incorporated by reference herein in its entirety.

BACKGROUND

1. Technical Field

The present disclosure relates to a recording apparatus.

2. Related Art

A recording apparatus having a viewing surface through which consumables such as ink accommodated in an ink tank can be viewed has been known. For example, an ink jet recording apparatus described in JP-A-2019-166842 includes an ink tank fixed to an apparatus main body. The ink tank accommodates ink in an accommodation chamber. An outer wall of the accommodation chamber has a viewing surface through which the inside of the accommodation chamber can be viewed from the outside.

When a user of the recording apparatus checks consumables such as ink through a viewing window such as a viewing surface, it may be difficult to view the consumables in some cases. The consumables here include not only ink but also media and the like.

SUMMARY

A recording apparatus according to the present disclosure includes: a recording portion that performs recording by ejecting a liquid onto a medium; a liquid accommodation portion that accommodates the liquid to be ejected by the recording portion; and a housing that includes an accommodation portion exterior that accommodates the liquid accommodation portion, in which the liquid accommodation portion includes a viewing region configured that the liquid accommodated is viewed, the accommodation portion exterior of the housing includes a viewing portion that faces the viewing region and is configured that the liquid is viewed, and a lighting portion that takes in light from outside the housing, and an optical path through which the light taken in passes is provided between the liquid accommodation portion and the accommodation portion exterior.

A recording apparatus according to the present disclosure includes: a recording portion that performs recording by ejecting a liquid onto a medium; a liquid accommodation portion that accommodates the liquid to be ejected by the recording portion; a housing that includes an accommodation portion exterior that accommodates the liquid accommodation portion; and a medium accommodation portion that includes a medium viewing portion configured that the medium is viewed and that accommodates the medium, in which the accommodation portion exterior includes a lighting portion that takes in light from outside the housing and an exterior opening that faces the medium accommodation portion, an optical path through which the light taken in through the lighting portion passes is provided inside the accommodation portion exterior, the medium accommodation portion includes a member opening that faces the exterior opening, and the optical path communicates with the member opening through the exterior opening.

DESCRIPTION OF EXEMPLARY EMBODIMENTS

Figure 1:
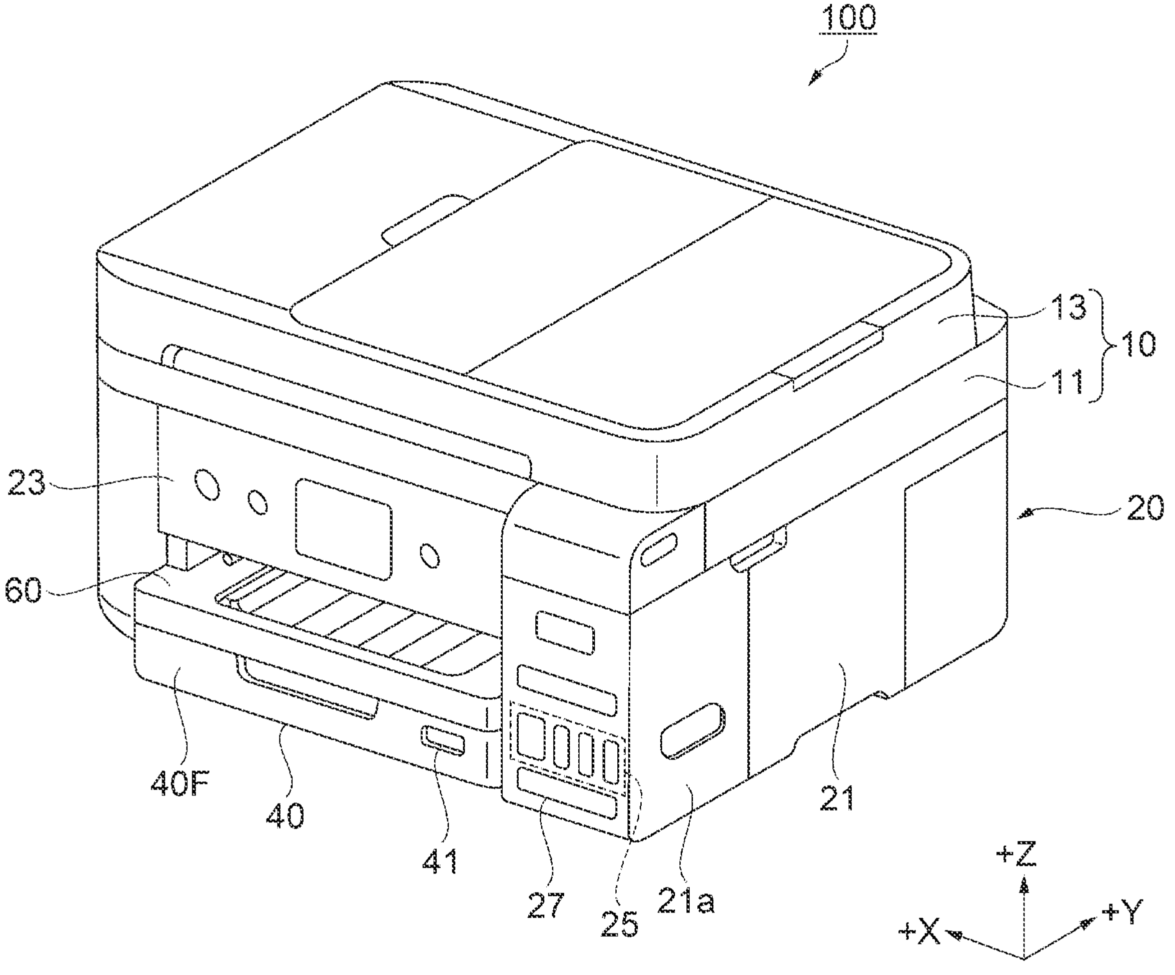
FIG. 1 is a view illustrating a schematic configuration of an appearance of a printer.

FIG. 1 is a view illustrating a schematic configuration of an appearance of a printer 100. The printer 100 illustrated in FIG. 1 is a multi-function machine including a reading unit 10 and a printing unit 20. The printer 100 has a reading function of reading a document and a printing function of performing printing on a printing medium M. The printer 100 corresponds to an example of a recording apparatus. The printing medium M corresponds to an example of a medium. Printing corresponds to an example of recording.

Multiple diagrams including FIG. 1 illustrate an XYZ coordinate system. An X axis, a Y axis, and a Z axis are orthogonal to one another. The X axis is an axis along a width of the printer 100. A −X direction corresponds to a right direction as viewed from a user when a front surface of the apparatus faces the user. A +X direction corresponds to a left direction as viewed from the user when the front surface of the apparatus faces the user. Here, the front side of the apparatus is a side surface on which an operation panel 23 is provided among peripheral side surfaces of the printer 100. The operation panel 23 will be described later.

The Y axis is an axis along a depth of the printer 100. A +Y direction corresponds to a direction from the front surface of the apparatus toward a back side of the apparatus. A −Y direction corresponds to a direction from the back side of the apparatus toward the front surface of the apparatus. The Z axis is an axis along a height of the printer 100. A +Z direction corresponds to a vertically upward direction. A −Z direction corresponds to a vertically downward direction.

The reading unit 10 reads a document. The reading unit 10 is provided above the printing unit 20. The reading unit 10 includes a document mounting portion 11 and a document transport portion 13. The document transport portion 13 is provided above the document mounting portion 11. The document transport portion 13 is supported so as to be openable/closable with respect to the document mounting portion 11.

The document mounting portion 11 is a flatbed type scanner. The document mounting portion 11 includes a contact image sensor and a document mounting surface. The contact image sensor and the document mounting surface are not illustrated. The document mounting portion 11 supports the document transport portion 13 when the document transport portion 13 is closed. When the document transport portion 13 is opened by the user, the document mounting surface is exposed. The contact image sensor reads the document mounted on the document mounting surface. The contact image sensor generates image data by reading the document.

The document transport portion 13 transports the document. The document is mounted on an upper surface of the document transport portion 13. The document transport portion 13 transports the mounted document to a position facing the contact image sensor. The document transport portion 13 is an auto document feeder (ADF). The document transport portion 13 transports the document read by the contact image sensor to a discharge port. The discharge port is not illustrated.

The printing unit 20 performs printing on the printing medium M. The printing unit 20 is an ink jet printer that performs printing by ejecting ink L onto the printing medium M. The printing unit 20 performs printing based on printing data. The printing data is data received from an external apparatus. The printing data may be image data generated by the reading unit 10. The printing unit 20 includes a cover body 21, the operation panel 23, a paper feed cassette 40, and a paper discharge tray 60.

The cover body 21 covers various functional portions arranged in the printing unit 20. The cover body 21 covers an outer peripheral portion of the printing unit 20. The cover body 21 includes one or more cover members. The cover body 21 includes an ink container cover portion 21*a*. The cover body 21 corresponds to an example of a housing.

The ink container cover portion 21*a* covers an ink container 34 as described later. The ink container cover portion 21*a* includes one or more cover members. The ink container cover portion 21*a* may be implemented by a part of one cover member. The ink container cover portion 21*a* includes an ink amount checking window 25 and a lighting window 27. Details of the ink amount checking window 25 and the lighting window 27 will be described later. The ink container cover portion 21*a* corresponds to an example of an accommodation portion exterior.

The operation panel 23 receives an operation from the user. The operation panel 23 is provided on a front surface of the printer 100. The operation panel 23 includes a display, an operation button, and the like. The display displays a result of an operation received from the user. The operation button is a power button or the like. The operation panel 23 may be implemented by a touch panel having a touch input function. The configuration of the operation panel 23 is not limited as long as the operation panel 23 can receive an operation from the user.

The paper feed cassette 40 accommodates the printing medium M. A printing head 31 to be described later performs printing on the accommodated printing medium M. The paper feed cassette 40 is provided at a position on a +X-direction side of the ink container cover portion 21*a*. The paper feed cassette 40 is provided at a position adjacent to the ink container cover portion 21*a*. The paper feed cassette 40 is configured to be detachable from the printing unit 20. The paper feed cassette 40 is configured to be removable in the −Y direction from the printing unit 20. The user moves the paper feed cassette 40 in the +Y direction to mount the paper feed cassette 40 on the printing unit 20. The paper feed cassette 40 includes a cassette front opening 41. The cassette front opening 41 is provided in a cassette front surface 40F of the paper feed cassette 40. Details of the cassette front opening 41 will be described later. The paper feed cassette 40 corresponds to an example of a medium accommodation portion.

The printing medium M subjected to printing by the printing head 31 is mounted on the paper discharge tray 60. The paper discharge tray 60 is provided above the paper feed cassette 40. The paper feed cassette 40, the paper discharge tray 60, and the operation panel 23 are arranged in this order in the +Z direction. The paper discharge tray 60 is configured to be pullable in the −Y direction. The paper discharge tray 60 can be moved in the −Y direction or the +Y direction by the user's operation. The paper discharge tray 60 may be configured to be movable in the −Y direction or the +Y direction by a tray driving mechanism (not illustrated). FIG. 1 illustrates a state in which the paper discharge tray 60 is housed in the printing unit 20.

Figure 2:
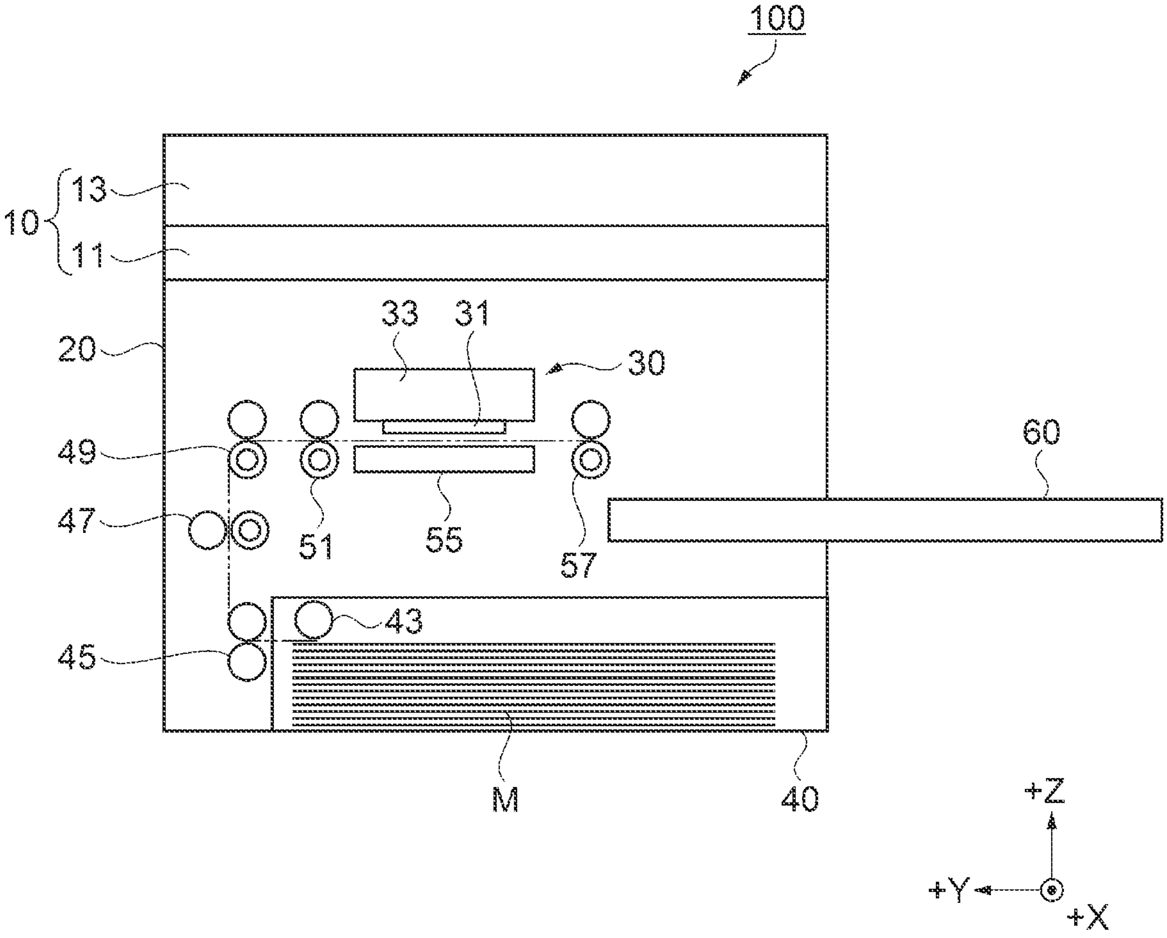
FIG. 2 is a view illustrating a sectional configuration of the printer.

FIG. 2 is a view illustrating a sectional configuration of the printer 100. FIG. 2 illustrates a Y-Z section of the printer 100. The printing unit 20 illustrated in FIG. 2 includes a printing portion 30, a plurality of transport roller pairs, a platen 55, the paper feed cassette 40, and the paper discharge tray 60.

The paper feed cassette 40 illustrated in FIG. 2 accommodates a plurality of printing media M. A pickup roller 43 is provided inside the paper feed cassette 40. The pickup roller 43 feeds the printing medium M mounted at the top in the paper feed cassette 40 into the printing unit 20.

The plurality of transport roller pairs transport the printing medium M. The plurality of transport roller pairs illustrated in FIG. 2 include a first transport roller pair 45, a second transport roller pair 47, a third transport roller pair 49, a fourth transport roller pair 51, and a paper discharge roller pair 57. The first transport roller pair 45, the second transport roller pair 47, the third transport roller pair 49, and the fourth transport roller pair 51 transport the printing medium M from the paper feed cassette 40 to the printing portion 30. The paper discharge roller pair 57 transports the printing medium M from the printing portion 30 to the paper discharge tray 60.

The printing portion 30 performs printing on the printing medium M. The printing portion 30 performs printing on the printing medium M by ejecting the ink L onto the printing medium M. The printing portion 30 corresponds to an example of a recording portion. The printing portion 30 includes the printing head 31 and a carriage 33.

The printing head 31 ejects the ink L onto the printing medium M. The printing head 31 is an ink jet head that ejects the ink L. The printing head 31 ejects the ink L stored in the ink container 34 to be described later onto the printing medium M. The ink L stored in the ink container 34 flows to the printing head 31 by an ink flow mechanism (not illustrated). The ink L that flowed to the printing head 31 is ejected from nozzles (not illustrated). The nozzles are arranged on a −Z-direction surface of the printing head 31. The printing head 31 ejects one or more types of ink L. The ink L corresponds to an example of a liquid.

The printing head 31 is mounted on the carriage 33. The carriage 33 is configured to be movable. The carriage 33 moves in the +X direction or the −X direction by a carriage driving mechanism (not illustrated). The carriage 33 moves the mounted printing head 31 in the +X direction or the −X direction. The printing head 31 ejects the ink L when moving in the +X direction or the −X direction. The printing head 31 may eject the ink L when moving in the +X direction and the −X direction.

The platen 55 supports the printing medium M transported by the fourth transport roller pair 51. The platen 55 is provided at a position facing the printing head 31. The printing head 31 ejects the ink L onto the printing medium M supported by the platen 55. The platen 55 may be coupled to a medium suction mechanism (not illustrated). The platen 55 supports the printing medium M sucked by the medium suction mechanism.

The printing medium M subjected to printing by the printing head 31 is mounted on the paper discharge tray 60. FIG. 2 illustrates the paper discharge tray 60 pulled out in the −Y direction. The paper discharge tray 60 receives the printing medium M transported from the printing portion 30 by the paper discharge roller pair 57.

Figure 3:
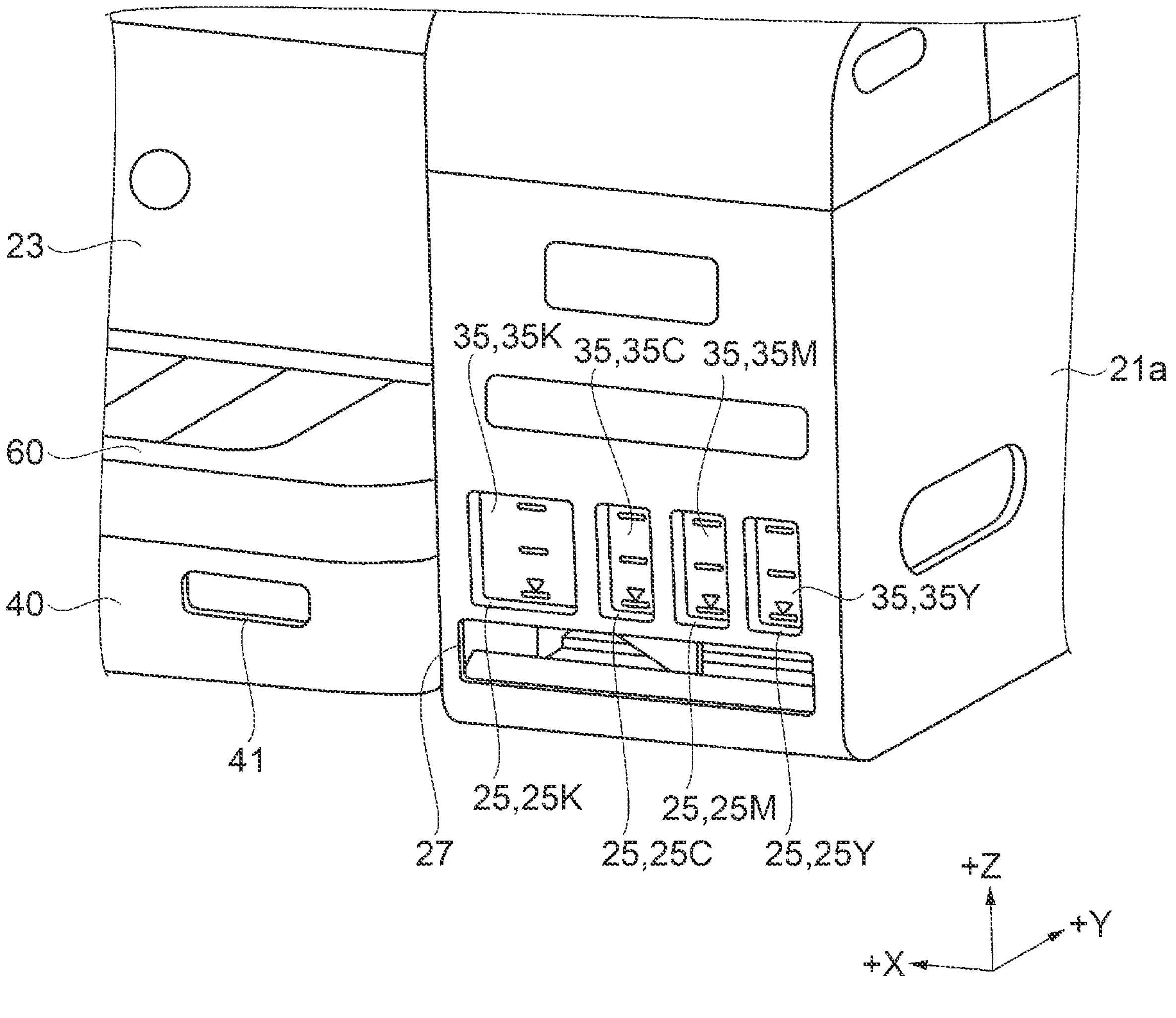
FIG. 3 is a view illustrating a schematic configuration of an ink container cover portion and the periphery of the ink container cover portion.

FIG. 3 is a view illustrating a schematic configuration of the ink container cover portion 21*a* and the periphery of the ink container cover portion 21*a*. FIG. 3 illustrates the ink container cover portion 21*a*, the operation panel 23, the paper feed cassette 40, and the paper discharge tray 60. The operation panel 23, the paper feed cassette 40, and the paper discharge tray 60 are arranged at positions adjacent to one another in the +X direction with respect to the ink container cover portion 21*a*. The ink container cover portion 21*a* includes the ink amount checking window 25 and the lighting window 27 on a −Y-direction surface.

The ink amount checking window 25 illustrated in FIG. 3 includes a black ink amount checking window 25K, a cyan ink amount checking window 25C, a magenta ink amount checking window 25M, and a yellow ink amount checking window 25Y. The black ink amount checking window 25K, the cyan ink amount checking window 25C, the magenta ink amount checking window 25M, and the yellow ink amount checking window 25Y are independent openings. The ink amount checking window 25 illustrated in FIG. 3 includes four openings, but is not limited thereto. The ink amount checking window 25 may include one or more openings. A light-transmissive checking window cover may be provided to the ink amount checking window 25. Since the checking window cover is provided to the ink amount checking window 25, it is possible to prevent dust from entering the inside of the ink container cover portion 21*a*. The ink amount checking window 25 corresponds to an example of a viewing portion. Any one of the black ink amount checking window 25K, the cyan ink amount checking window 25C, the magenta ink amount checking window 25M, and the yellow ink amount checking window 25Y corresponds to an example of a first region and a second region.

The ink amount checking window 25 is configured such that an ink amount indicating portion 35 is viewable. The ink amount indicating portion 35 constitutes a part of a wall surface of the ink container 34. The ink amount indicating portion 35 is configured such that the ink L stored inside the ink container 34 is viewable. The ink amount indicating portion 35 is formed of, for example, a light-transmissive material. The user can grasp the amount of ink by checking a water level of the ink L viewed through the ink amount indicating portion 35.

The black ink amount checking window 25K is configured such that a black ink amount indicating portion 35K is viewable. The black ink amount indicating portion 35K constitutes a part of a wall surface of a black ink container 34K. The black ink amount indicating portion 35K is configured such that a water level of black ink LB stored inside the black ink container 34K is viewable.

The cyan ink amount checking window 25C is configured such that a cyan ink amount indicating portion 35C is viewable. The cyan ink amount indicating portion 35C constitutes a part of a wall surface of a cyan ink container 34C. The cyan ink amount indicating portion 35C is configured such that a water level of cyan ink LC stored inside the cyan ink container 34C is viewable.

The magenta ink amount checking window 25M is configured such that a magenta ink amount indicating portion 35M is viewable. The magenta ink amount indicating portion 35M constitutes a part of a wall surface of a magenta ink container 34M. The magenta ink amount indicating portion 35M is configured such that a water level of magenta ink LM stored inside the magenta ink container 34M is viewable.

The yellow ink amount checking window 25Y is configured such that a yellow ink amount indicating portion 35Y is viewable. The yellow ink amount indicating portion 35Y constitutes a part of a wall surface of a yellow ink container 34Y. The yellow ink amount indicating portion 35Y is configured such that a water level of yellow ink LY stored inside the yellow ink container 34Y is viewable.

The ink amount indicating portion 35 is used when the black ink amount indicating portion 35K, the cyan ink amount indicating portion 35C, the magenta ink amount indicating portion 35M, and the yellow ink amount indicating portion 35Y are illustrated without distinction. Any one of the black ink amount indicating portion 35K, the cyan ink amount indicating portion 35C, the magenta ink amount indicating portion 35M, and the yellow ink amount indicating portion 35Y corresponds to an example of a viewing region and a second viewing region.

The lighting window 27 takes in external light, which is light from outside the cover body 21, to the inside of the ink container cover portion 21*a*. The lighting window 27 is an opening that takes in the external light. The lighting window 27 is provided below the ink amount checking window 25. The lighting window 27 is provided below the black ink amount checking window 25K, the cyan ink amount checking window 25C, the magenta ink amount checking window 25M, and the yellow ink amount checking window 25Y. A position where the lighting window 27 is arranged is not limited as long as the lighting window 27 can take in the external light. The lighting window 27 is preferably provided below the ink amount checking window 25. In this case, it is possible to effectively utilize a region below the ink amount checking window 25. The lighting window 27 corresponds to an example of a lighting portion.

The lighting window 27 is preferably provided below the ink amount checking window 25. Since the lighting window 27 is provided below the ink amount checking window 25, the lighting window 27 can take in the external light when the user is working above the ink amount checking window 25.

Figure 4:
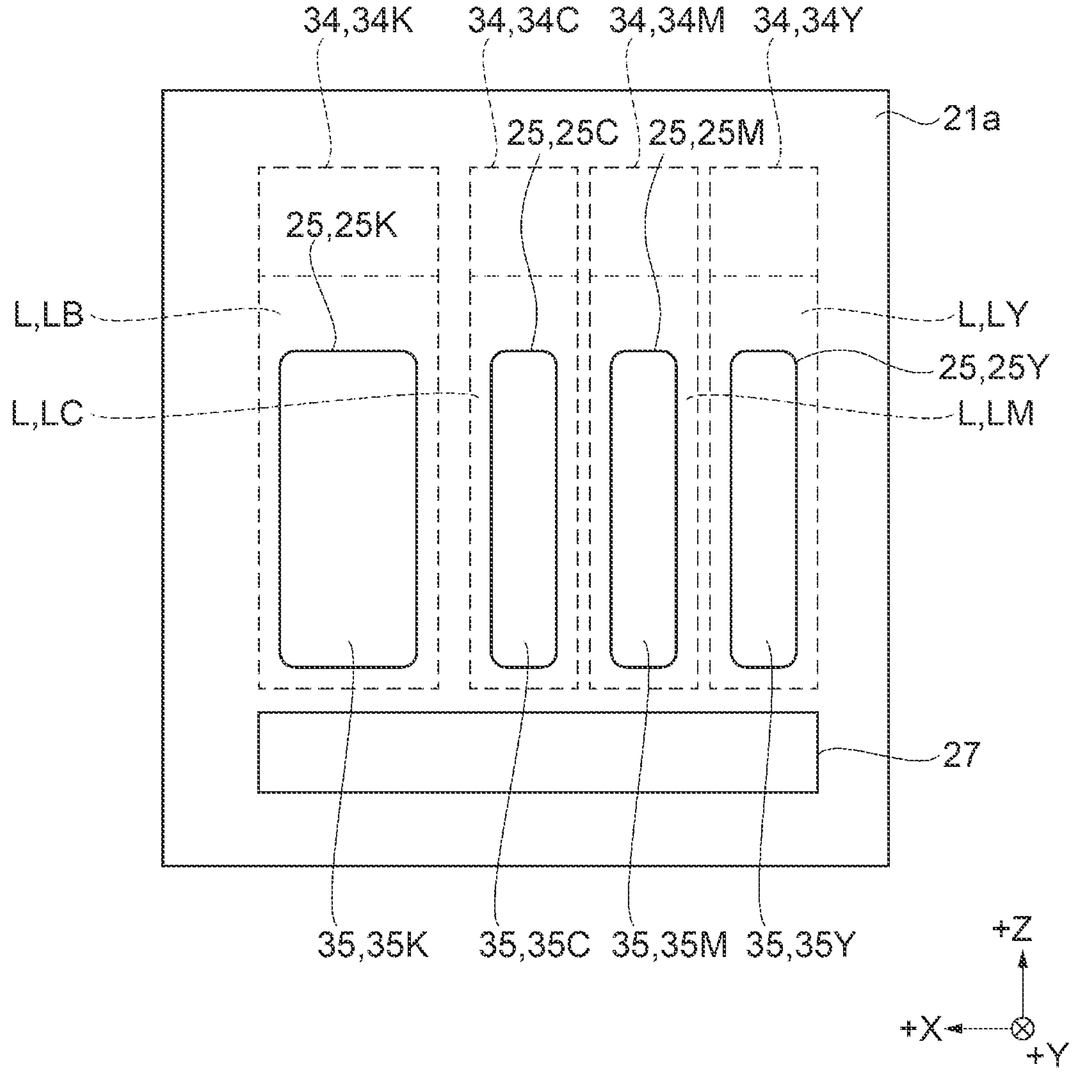
FIG. 4 is a view illustrating a −Y-direction surface of the ink container cover portion.

FIG. 4 illustrates the −Y-direction surface of the ink container cover portion 21*a*. FIG. 4 illustrates a front surface portion of the ink container cover portion 21*a* when the user views the ink container cover portion 21*a* from the −Y direction. FIG. 4 illustrates the ink container 34. The ink container 34 is arranged more toward the +Y direction than the front surface portion of the ink container cover portion 21*a* is.

As illustrated in FIG. 4, the ink amount checking window 25 and the lighting window 27 are provided in the front surface portion of the ink container cover portion 21*a*. The ink amount checking window 25 illustrated in FIG. 4 includes the black ink amount checking window 25K, the cyan ink amount checking window 25C, the magenta ink amount checking window 25M, and the yellow ink amount checking window 25Y.

As illustrated in FIG. 4, the ink amount indicating portion 35 is arranged for the ink amount checking window 25. The black ink amount indicating portion 35K is arranged for the black ink amount checking window 25K. The cyan ink amount indicating portion 35C is arranged for the cyan ink amount checking window 25C. The magenta ink amount indicating portion 35M is arranged for the magenta ink amount checking window 25M. The yellow ink amount indicating portion 35Y is arranged for the yellow ink amount checking window 25Y.

FIG. 4 illustrates the black ink container 34K, the cyan ink container 34C, the magenta ink container 34M, and the yellow ink container 34Y. The ink container 34 is used when the black ink container 34K, the cyan ink container 34C, the magenta ink container 34M, and the yellow ink container 34Y are illustrated without distinction. Any two of the black ink container 34K, the cyan ink container 34C, the magenta ink container 34M, and the yellow ink container 34Y correspond to examples of a liquid accommodation portion and a second liquid accommodation portion.

The black ink container 34K accommodates the black ink LB. The black ink container 34K includes the black ink amount indicating portion 35K as a part of the peripheral surface. The black ink amount indicating portion 35K is configured such that the accommodated black ink LB is viewable. The black ink container 34K is arranged at a position on a +Y direction-side of the black ink amount checking window 25K. The black ink container 34K supplies the black ink LB to the printing head 31.

The cyan ink container 34C accommodates the cyan ink LC. The cyan ink container 34C includes the cyan ink amount indicating portion 35C as a part of the peripheral surface. The cyan ink amount indicating portion 35C is configured such that the accommodated cyan ink LC is viewable. The cyan ink container 34C is arranged at a position on a +Y-direction side of the cyan ink amount checking window 25C. The cyan ink container 34C supplies the cyan ink LC to the printing head 31.

The magenta ink container 34M accommodates the magenta ink LM. The magenta ink container 34M includes the magenta ink amount indicating portion 35M as a part of the peripheral surface. The magenta ink amount indicating portion 35M is configured such that the accommodated magenta ink LM is viewable. The magenta ink container 34M is arranged at a position on a +Y-direction side of the magenta ink amount checking window 25M. The magenta ink container 34M supplies the magenta ink LM to the printing head 31.

The yellow ink container 34Y accommodates the yellow ink LY. The yellow ink container 34Y includes the yellow ink amount indicating portion 35Y as a part of the peripheral surface. The yellow ink amount indicating portion 35Y is configured such that the stored yellow ink LY is viewable. The yellow ink container 34Y is arranged at a position on a +Y-direction side of the yellow ink amount checking window 25Y. The yellow ink container 34Y supplies the yellow ink LY to the printing head 31. Two inks L among the black ink LB, the cyan ink LC, the magenta ink LM, and the yellow ink LY correspond to examples of the liquid and a second liquid.

The ink container cover portion 21*a* illustrated in FIG. 4 accommodates the black ink container 34K, the cyan ink container 34C, the magenta ink container 34M, and the yellow ink container 34Y, but is not limited thereto. The ink container cover portion 21*a* houses one or more ink containers 34. In FIG. 4, the black ink container 34K, the cyan ink container 34C, the magenta ink container 34M, and the yellow ink container 34Y are arranged in the +X direction in this order, but are not limited thereto. The arrangement order of the plurality of ink containers 34 can be changed as appropriate. One or more ink containers 34 may store the ink L other than the black ink LB, the cyan ink LC, the magenta ink LM, and the yellow ink LY. The ink container 34 may be configured to be replenishable with ink through a filling port (not illustrated). In this case, it is desirable that the ink L in the ink container 34 can be easily viewed even when the user replenishes the ink container 34 with the ink L.

The lighting window 27 is provided below the black ink amount checking window 25K, the cyan ink amount checking window 25C, the magenta ink amount checking window 25M, and the yellow ink amount checking window 25Y. A width of the lighting window 27 illustrated in FIG. 4 along the X axis is larger than the sum of widths of the four ink amount checking windows 25 along the X axis. The width of the lighting window 27 along the X axis is preferably larger than the width of each of the ink amount checking windows 25 along the X axis. The width of the lighting window 27 along the X axis is preferably larger than the sum of the widths of two adjacent ink amount checking windows 25 along the X axis. By making the width of the lighting window 27 along the X axis larger than the width of one ink amount checking window 25 along the X axis, the lighting window 27 can more easily take in the external light. Further, the lighting window 27 may be divided into a plurality of parts. In this case, the width of the lighting window 27 along the X axis indicates the total width of the plurality of lighting windows 27 along the X axis.

Figure 5:
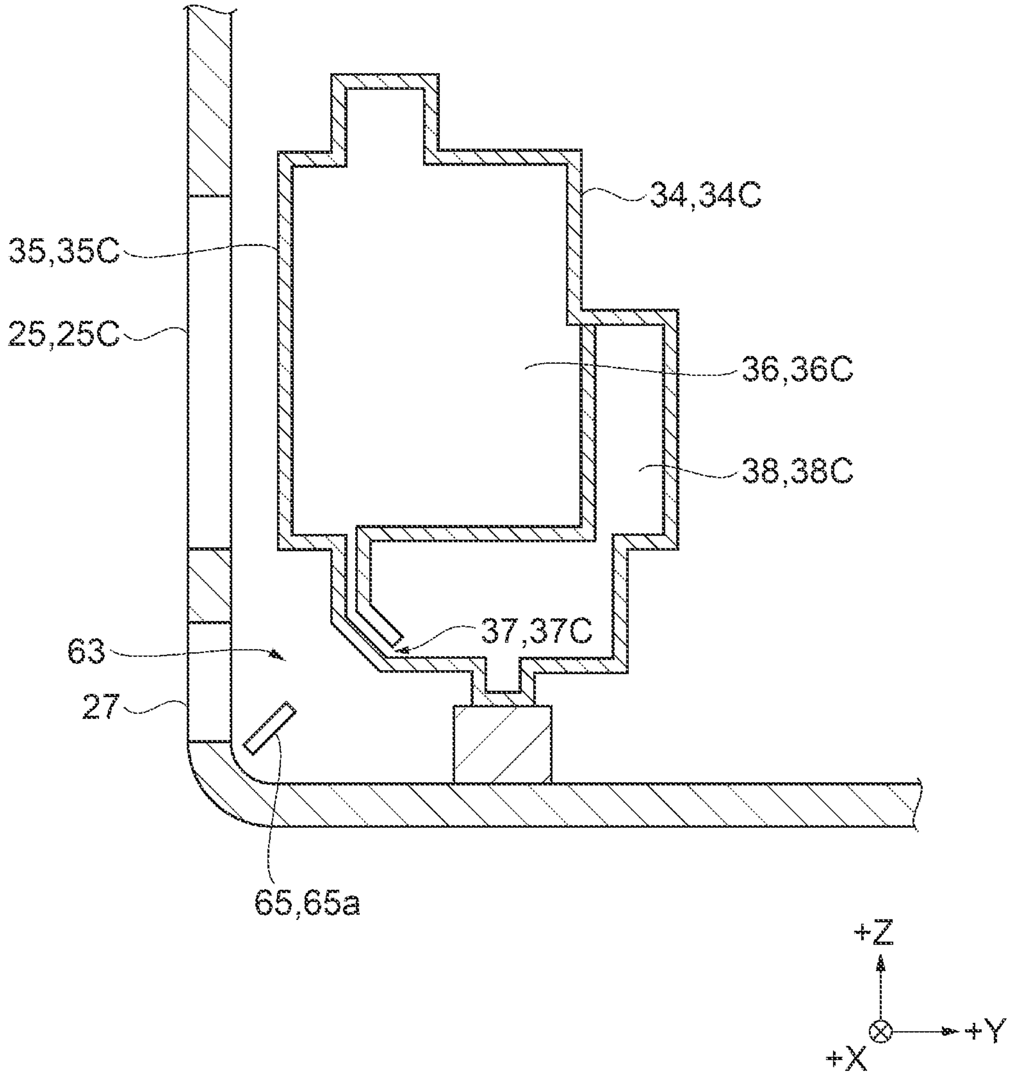
FIG. 5 is a view illustrating a sectional configuration of the ink container cover portion including an ink container.

FIG. 5 illustrates a sectional configuration of the ink container cover portion 21*a* including the ink container 34. FIG. 5 illustrates a Y-Z section of the ink container cover portion 21*a*. FIG. 5 illustrates the ink container cover portion 21*a* and the ink container 34. The cyan ink container 34C is illustrated as an example of the ink container 34 in FIG. 5. The sectional configuration of the cyan ink container 34C is the same as the sectional configurations of the black ink container 34K, the magenta ink container 34M, and the yellow ink container 34Y.

The ink container cover portion 21*a* illustrated in FIG. 5 includes the cyan ink amount checking window 25C and the lighting window 27. The lighting window 27 is provided at a position on a −Z-direction side of the cyan ink amount checking window 25C. The ink container cover portion 21*a* and the cyan ink container 34C are spaced apart from each other in a direction along the Y axis.

The ink container 34 includes the ink amount indicating portion 35, an ink storage chamber 36 and a gas-liquid exchange port 37. A buffer chamber 38 is provided under the ink container 34. The buffer chamber 38 may be configured integrally with the ink container 34 or may be configured separately from the ink container 34. The gas-liquid exchange port 37 corresponds to an example of a gas-liquid exchange portion. The buffer chamber 38 corresponds to one example of a storage portion. The cyan ink container 34C, which is an example of the ink container 34, includes the cyan ink amount indicating portion 35C, a cyan ink storage chamber 36C, and a cyan container gas-liquid exchange port 37C. A cyan ink buffer chamber 38C is provided under the cyan ink container 34C.

The ink amount indicating portion 35 is provided at a position facing the ink amount checking window 25. The ink amount indicating portion 35 is provided at a part of the ink container 34. The ink amount indicating portion 35 is configured such that the ink L stored in the ink storage chamber 36 is viewable.

The ink storage chamber 36 stores the ink L to be ejected by the printing head 31. The cyan ink storage chamber 36C stores the cyan ink LC to be ejected by the printing head 31. The ink storage chamber 36 communicates with the gas-liquid exchange port 37. The cyan ink storage chamber 36C communicates with the cyan container gas-liquid exchange port 37C.

The gas-liquid exchange port 37 performs gas-liquid exchange. The gas-liquid exchange port 37 is arranged more toward the −Z direction than ejection ports of the printing head 31. The ejection ports of the printing head 31 are openings of the nozzles that eject the ink L. The gas-liquid exchange port 37 applies, to the ejection ports, a negative pressure of a differential head corresponding to a height between positions where the ejection ports and the gas-liquid exchange port 37 are arranged, along the Z axis. The gas-liquid exchange port 37 has an opening area that can maintain a meniscus of the ink L. The gas-liquid exchange port 37 is provided inside the buffer chamber 38. The cyan container gas-liquid exchange port 37C, which is an example of the gas-liquid exchange port 37, is arranged more toward the −Z direction than the ejection ports of the printing head 31 is. The cyan container gas-liquid exchange port 37C applies, to the ejection ports, a negative pressure of a differential head corresponding to a height between positions where the ejection ports and the cyan container gas-liquid exchange port 37C are arranged, along the Z axis. The cyan container gas-liquid exchange port 37C has an opening area that can maintain a meniscus of the cyan ink LC. The cyan container gas-liquid exchange port 37C is provided inside the cyan ink buffer chamber 38C.

The buffer chamber 38 can accommodate the ink L flowing out from the gas-liquid exchange port 37. When the air in the ink storage chamber 36 expands due to a change in air pressure, temperature, or the like, the meniscus formed in the gas-liquid exchange port 37 may be destroyed. When the meniscus formed in the gas-liquid exchange port 37 is destroyed, the ink L stored in the ink storage chamber 36 flows out to the buffer chamber 38. The buffer chamber 38 stores the ink L flowing out from the gas-liquid exchange port 37 to prevent the ink L from flowing outside the ink container 34. The cyan ink buffer chamber 38C, which is an example of the buffer chamber 38, can store the cyan ink LC flowing out from the cyan container gas-liquid exchange port 37C.

The lighting window 27 is provided at a position facing the buffer chamber 38. The lighting window 27 is provided at a position on a −Y-direction side of the buffer chamber 38. For example, the lighting window 27 is provided at a position on a −Y-direction-side of the cyan ink buffer chamber 38C.

The ink container 34 includes the gas-liquid exchange port 37 for gas-liquid exchange. The printer 100 includes the buffer chamber 38 that accommodates the ink L flowing out from the gas-liquid exchange port 37. The lighting window 27 is provided at a position in the ink container cover portion 21*a*, the position facing the buffer chamber 38. Since the buffer chamber 38 is provided under the ink storage chamber 36, the ink amount indicating portion 35 is provided at a level higher than the buffer chamber 38. The ink amount checking window 25 facing the ink amount indicating portion 35 is provided at a level higher than the buffer chamber 38. As a result, it is possible to increase the area of the lighting window 27 provided below the ink amount checking window 25.

The front surface portion of the ink container cover portion 21*a* and the ink container 34 are spaced apart from each other. A space is provided between the ink container cover portion 21*a* and the ink container 34. The space includes a first interior region that is continuous to the lighting window 27 inside the ink container cover portion 21*a* and a second interior region that is positioned between the ink container cover portion 21*a* and the ink container 34 and above the first interior region. The light taken in through the lighting window 27 can pass through the space. The space will hereinafter be referred to as a light path 63. The light path 63 is a light passage space through which the light taken in through the lighting window 27 passes. The light path 63 corresponds to an example of an optical path.

The printer 100 includes the printing portion 30 that performs printing by ejecting the ink L onto the printing medium M, the ink container 34 that accommodates the ink L to be ejected by the printing portion 30, and the cover body 21 that includes the ink container cover portion 21*a* accommodating the ink container 34. The ink container 34 includes the ink amount indicating portion 35 configured such that the accommodated ink L is viewable. The ink container cover portion 21*a* of the cover body 21 faces the ink amount indicating portion 35, and includes the ink amount checking window 25 configured such that the ink L is viewable and the lighting window 27 that takes in light from outside the cover body 21. The printer 100 includes the light path 63 through which the light taken in passes, between the ink container 34 and the ink container cover portion 21*a*. The user can easily view the ink L in the ink container 34 by the light taken in through the lighting window 27. Since the ink L in the ink container 34 can be easily viewed by the external light, the printer 100 is cost-saving and power efficient.

The printer 100 includes, for an example, the black ink container 34K that accommodates the black ink LB and the cyan ink container 34C that accommodates the cyan ink LC. The cyan ink container 34C includes the cyan ink amount indicating portion 35C configured such that the accommodated cyan ink LC is viewable. The ink amount checking window 25 includes the black ink amount checking window 25K facing the black ink amount indicating portion 35K and the cyan ink amount checking window 25C facing the cyan ink amount indicating portion 35C. The lighting window 27 is provided below the black ink amount checking window 25K and the cyan ink amount checking window 25C. It becomes easier for the user to view the amount of black ink in the black ink container 34K and the amount of cyan ink in the cyan ink container 34C.

A reflecting member 65 is preferably provided in the light path 63. FIG. 5 illustrates a configuration in which a first reflecting plate 65*a* is provided in the light path 63. The first reflecting plate 65*a* is an example of the reflecting member 65. The first reflecting plate 65*a* reflects the light taken in through the lighting window 27 to the second interior region in the +Z direction. The first reflecting plate 65*a* reflects the light to the ink amount indicating portion 35. The first reflecting plate 65*a* reflects the light to the second interior region, so that it becomes easier for the user to view the ink amount indicating portion 35. The reflecting member 65 corresponds to an example of a reflecting portion.

The printer 100 includes the first reflecting plate 65*a* that is provided in the light path 63 and reflects the light, and the first reflecting plate 65*a* reflects the light to the ink amount indicating portion 35. Since the first reflecting plate 65*a* is provided, it becomes easier for the user to view the ink amount indicating portion 35.

Figure 6:
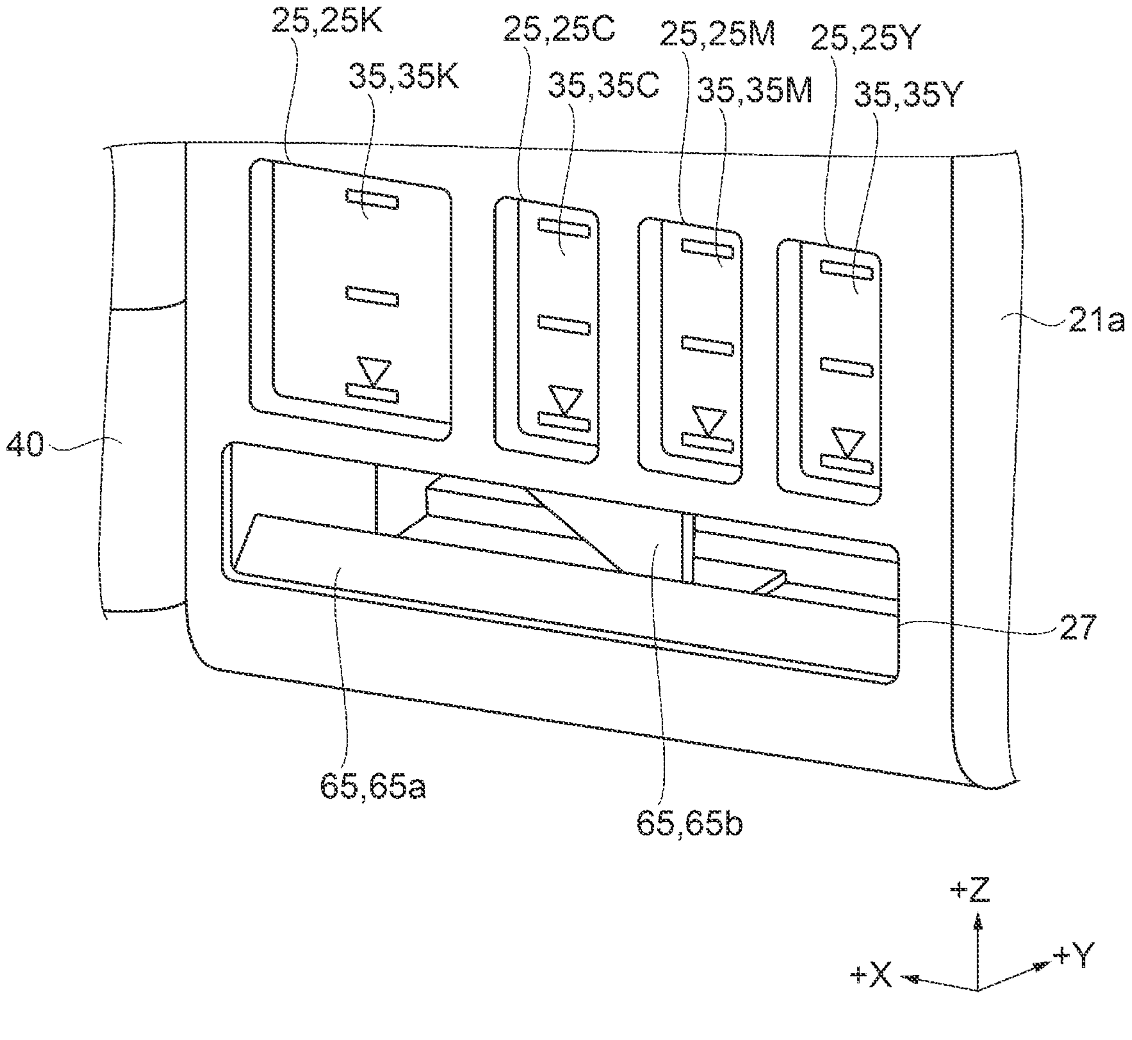
FIG. 6 is a view illustrating a schematic configuration inside the ink container cover portion.

A second reflecting plate 65*b* may be provided as the reflecting member 65 in the light path 63. FIG. 6 illustrates a schematic configuration inside the ink container cover portion 21*a*. FIG. 6 illustrates the members arranged in the first interior region of the light path 63 that is continuous to the lighting window 27. FIG. 6 illustrates the first reflecting plate 65*a* and the second reflecting plate 65*b*. The first reflecting plate 65*a* reflects the light taken in through the lighting window 27 in the +Z direction. The second reflecting plate 65*b* reflects the light taken in through the lighting window 27 in the +X direction. The second reflecting plate 65*b* reflects the light toward the paper feed cassette 40. Although FIG. 6 illustrates the first reflecting plate 65*a* and the second reflecting plate 65*b*, the present disclosure is not limited to this configuration. The printer 100 may include any one of the first reflecting plate 65*a* and the second reflecting plate 65*b*. The printer 100 preferably includes the first reflecting plate 65*a* and the second reflecting plate 65*b*.

Figure 7:
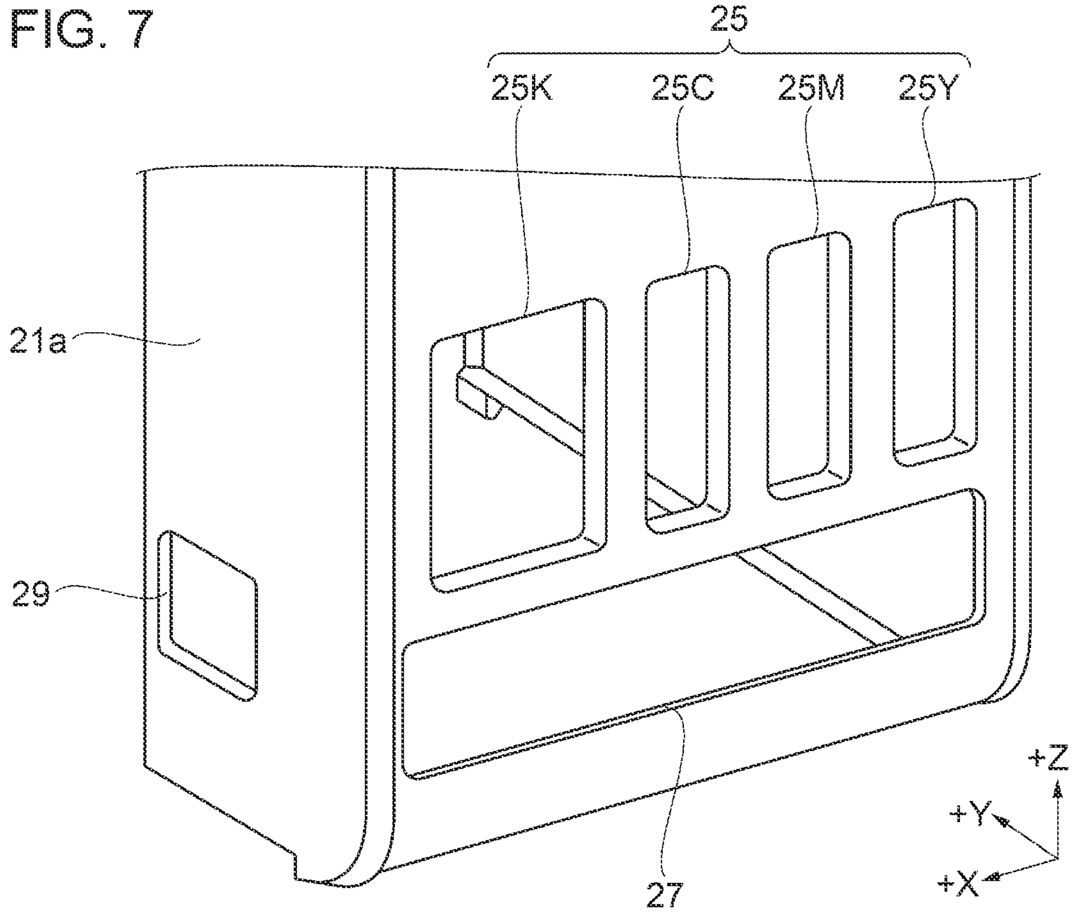
FIG. 7 is a view illustrating a schematic configuration of the ink container cover portion.

FIG. 7 illustrates a schematic configuration of the ink container cover portion 21*a*. FIG. 7 illustrates a +X-direction side surface and a front surface of the ink container cover portion 21*a*. The front surface of the ink container cover portion 21*a* includes the ink amount checking window 25 and the lighting window 27. The ink amount checking window 25 includes the black ink amount checking window 25K, the cyan ink amount checking window 25C, the magenta ink amount checking window 25M, and the yellow ink amount checking window 25Y.

The +X-direction side surface of the ink container cover portion 21*a* includes a cover portion opening 29. The +X-direction side surface of the ink container cover portion 21*a* is a side surface facing the paper feed cassette 40. The cover portion opening 29 is provided at a position facing the paper feed cassette 40. The cover portion opening 29 is provided at a position coupled to the light path 63. The cover portion opening 29 corresponds to an example of an exterior opening.

Figure 8:
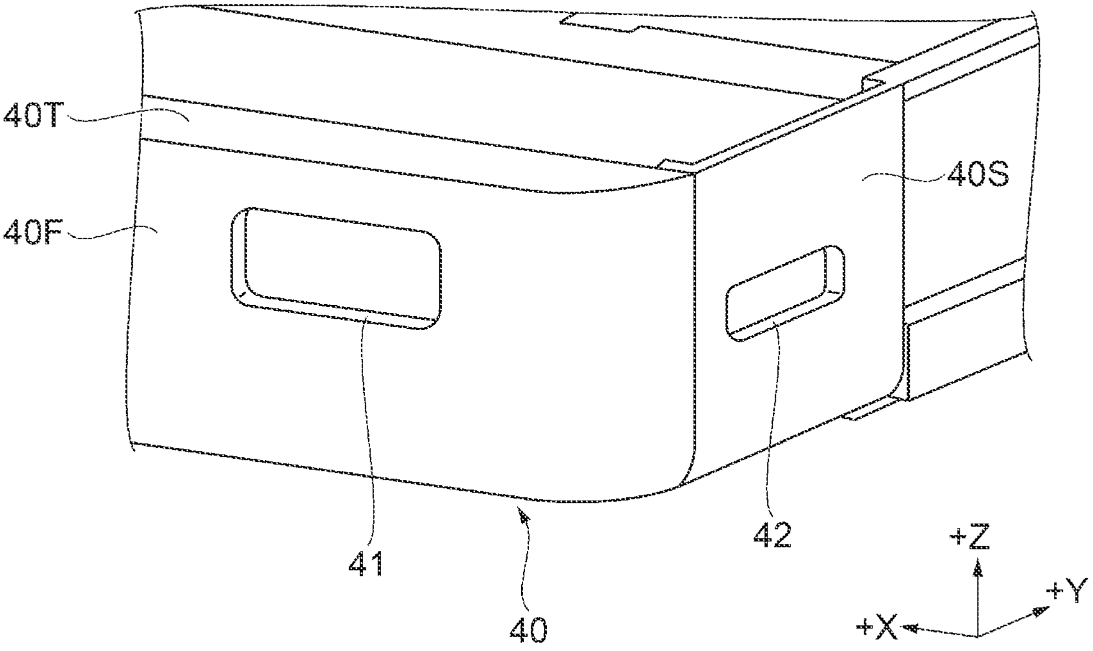
FIG. 8 is a view illustrating a partially enlarged configuration of a paper feed cassette.

FIG. 8 illustrates a partially enlarged configuration of the paper feed cassette 40. A portion of the paper feed cassette 40 illustrated in FIG. 8 includes a region adjacent to the +X-direction side surface of the ink container cover portion 21*a*. FIG. 8 illustrates a cassette front surface 40F, a cassette side surface 40S, a cassette top surface 40T, a cassette front opening 41, and a cassette side opening 42.

The cassette front surface 40F is a −Y-direction side surface of the paper feed cassette 40. The cassette front surface 40F is a side surface disposed in a direction in which the paper feed cassette 40 is pulled out. When the paper feed cassette 40 is mounted on the printer 100, the cassette front surface 40F constitutes a part of the front surface of the printer 100. The cassette front opening 41 is formed in the cassette front surface 40F. The cassette front surface 40F corresponds to an example of a first surface.

The cassette side surface 40S is a −X-direction side surface of the paper feed cassette 40. The cassette side surface 40S faces the +X-direction side surface of the ink container cover portion 21*a*. The cassette side opening 42 is formed in the cassette side surface 40S.

The cassette top surface 40T is a +Z-direction surface of the paper feed cassette 40. When the paper feed cassette 40 is mounted on the printer 100, a region of the cassette top surface 40T that is coupled to the cassette front surface 40F may be arranged at a position that can be viewed by the user.

The cassette front opening 41 is configured such that the printing medium M accommodated inside the paper feed cassette 40 can be viewed by the user. The cassette front opening 41 is provided in the cassette front surface 40F. The cassette front opening 41 illustrated in FIG. 8 is provided at a position on a −X-direction side of the cassette front surface 40F. The cassette front opening 41 is provided in a region adjacent to the ink container cover portion 21*a*. The cassette front opening 41 corresponds to an example of a medium viewing portion.

The cassette side opening 42 is provided in the cassette side surface 40S. When the paper feed cassette 40 is mounted on the printer 100, the cassette side opening 42 faces the cover portion opening 29. The cassette side opening 42 allows the light passing through the light path 63 to pass into the paper feed cassette 40 through the cover portion opening 29. The cassette side opening 42 corresponds to an example of a member opening.

Figure 9:
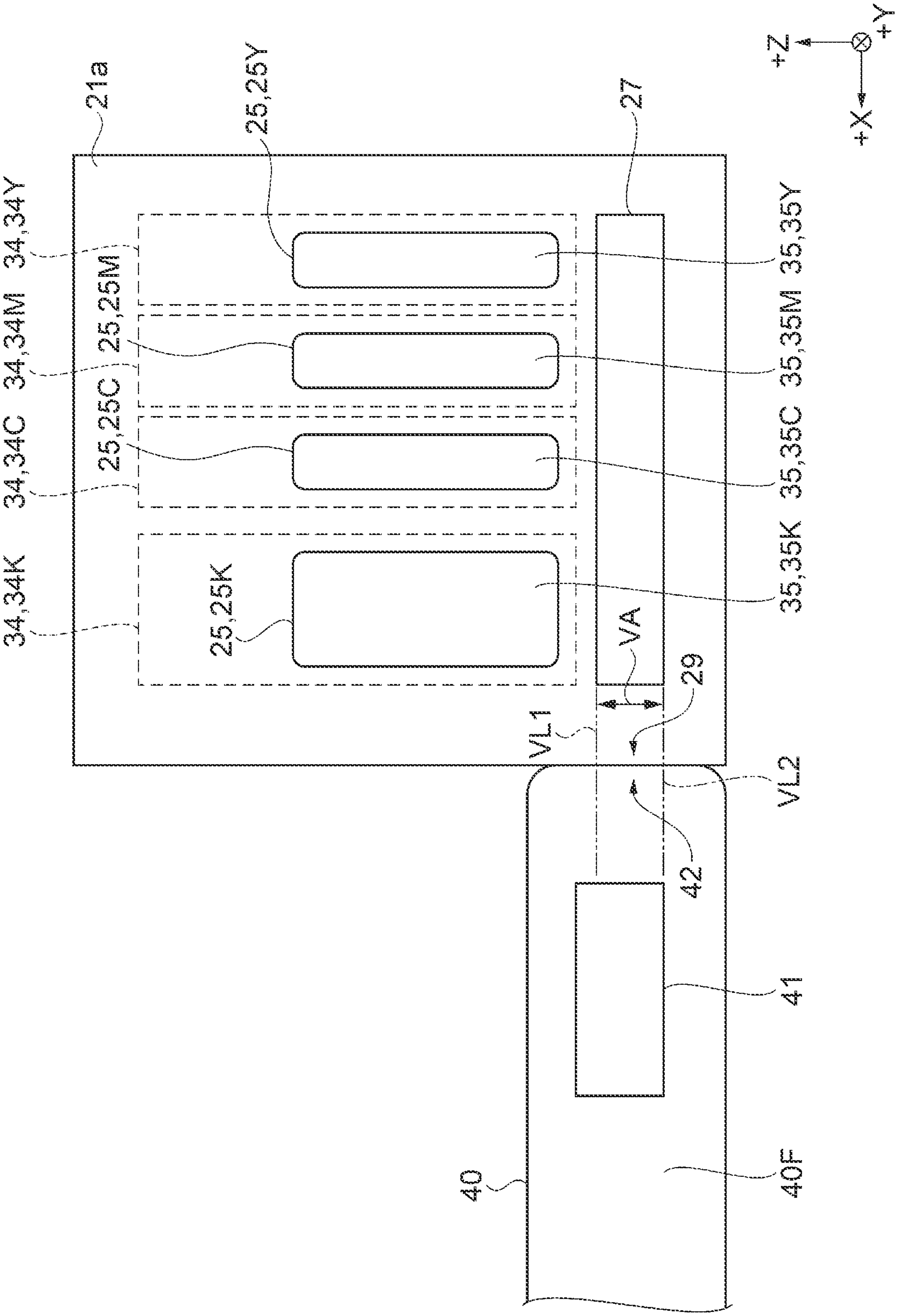
FIG. 9 is a view illustrating a relationship between the paper feed cassette and the ink container cover portion.

FIG. 9 illustrates a relationship between the paper feed cassette 40 and the ink container cover portion 21*a*. FIG. 9 illustrates a part of a front view of the printer 100. FIG. 9 illustrates a part of the paper feed cassette 40 and a part of the ink container cover portion 21*a*. The configuration of the ink container cover portion 21*a* illustrated in FIG. 9 is the same as the configuration of the ink container cover portion 21*a* illustrated in FIG. 4.

The paper feed cassette 40 is arranged at a position adjacent to the ink container cover portion 21*a* in the +X direction. The cassette front opening 41 is arranged at a position on a +X-direction side of the lighting window 27. The light path 63 (not illustrated) is provided inside the ink container cover portion 21*a* on a +Y-direction side of the lighting window 27.

FIG. 9 illustrates a first virtual line VL1, a second virtual line VL2, and a virtual range VA. The first virtual line VL1 is a virtual line passing through an upper end of the lighting window 27 and extending in the +X direction. The second virtual line VL2 is a virtual line passing through a lower end of the lighting window 27 and extending in the +X direction. The virtual range VA is a region between the first virtual line VL1 and the second virtual line VL2.

The cover portion opening 29 is provided at a position that includes at least a part of the virtual range VA. The cassette side opening 42 is provided at a position that includes at least a part of the virtual range VA. The cover portion opening 29 and the cassette side opening 42 are provided at positions at least partially overlap each other. The cover portion opening 29 and the cassette side opening 42 are arranged at positions through which the light passing through the light path 63 can pass. The light path 63 communicates with the cassette side opening 42 through the cover portion opening 29.

The cassette front opening 41 is provided at a position that includes at least a part of the virtual range VA. Therefore, the lighting window 27 and the cassette front opening 41 overlap in the +Z direction when the user views from the −X direction. The position in the −X direction is a position facing the cover portion opening 29.

The printer 100 includes the paper feed cassette 40 that accommodates the printing medium M. The ink container cover portion 21*a* includes the cover portion opening 29 that faces the paper feed cassette 40. The paper feed cassette 40 includes the cassette side opening 42 facing the cover portion opening 29 and the cassette front opening 41 configured such that the accommodated printing media M is viewable. The light path 63 communicates with the cassette side opening 42 through the cover portion opening 29. The user can easily view the amount of ink in the ink container 34 and the printing medium M accommodated in the paper feed cassette 40 by the light taken in through the lighting window 27.

The lighting window 27 and the cassette front opening 41 preferably overlap each other in the +Z direction when viewed from a position facing the cover portion opening 29 by the user. When the light taken in through the lighting window 27 passes through the light path 63 toward the cassette front opening 41, a decrease in the amount of light is suppressed.

Figure 10:
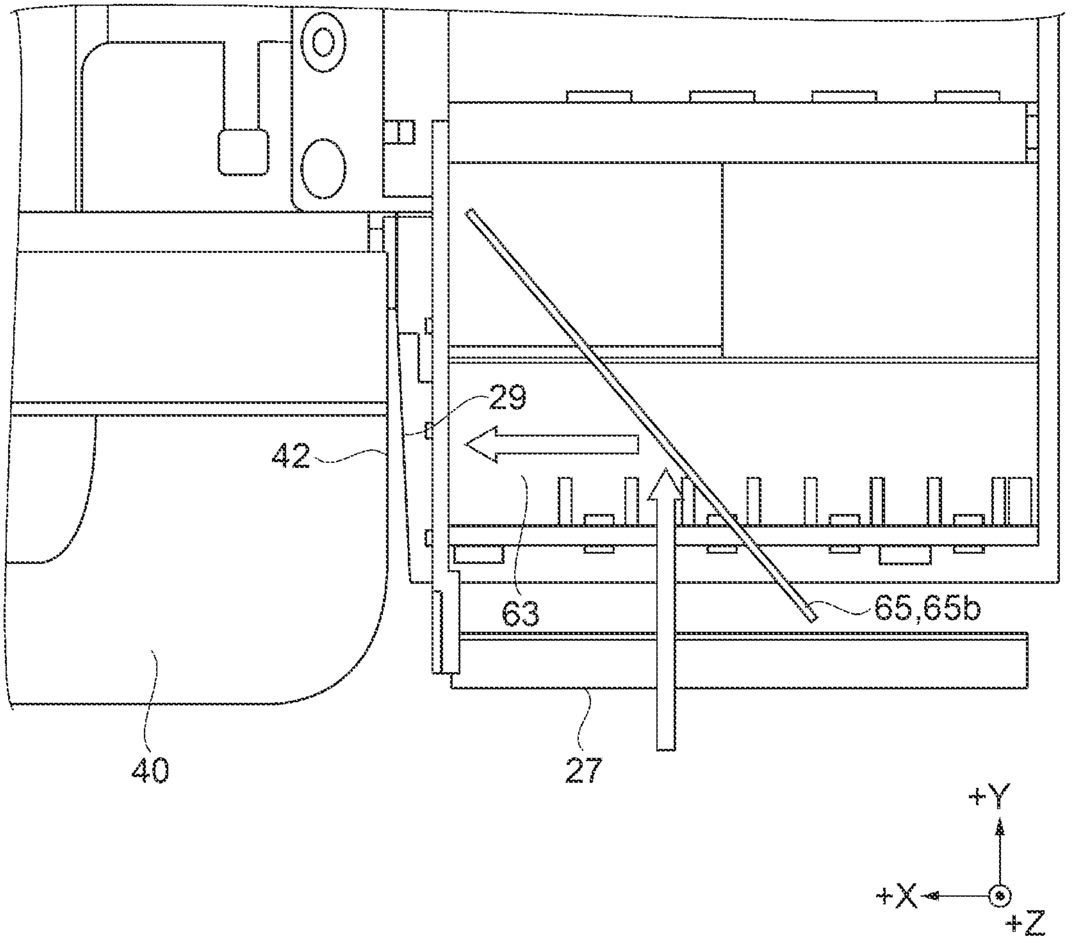
FIG. 10 is a view illustrating a path of light taken in through a lighting window toward the paper feed cassette.

FIG. 10 illustrates a path along which the light taken in through the lighting window 27 travels toward the paper feed cassette 40. FIG. 10 illustrates an X-Y section including a part of the paper feed cassette 40 and a part of the ink container cover portion 21*a*. The second reflecting plate 65*b* is provided inside the ink container cover portion 21*a*. The second reflecting plate 65*b* is provided in the light path 63.

As illustrated in FIG. 10, the cover portion opening 29 and the cassette side opening 42 are provided at positions facing each other. The cover portion opening 29 is provided inside the light path 63. The light path 63 communicates with the cassette side opening 42 through the cover portion opening 29.

The light taken in through the lighting window 27 is incident on the light path 63 provided inside the ink container cover portion 21*a*. The incident light is reflected toward the cover portion opening 29 by the second reflecting plate 65*b* provided in the light path 63. The reflected light passes through the cover portion opening 29 and the cassette side opening 42 and is incident on the paper feed cassette 40. The light incident on the paper feed cassette 40 makes it easier for the user to view the printing medium M accommodated in the paper feed cassette 40 through the cassette front opening 41.

The printer 100 includes the printing portion 30 that performs printing by ejecting the ink L onto the printing medium M, the ink container 34 that accommodates the ink L to be ejected by the printing portion 30, the cover body 21 that includes the ink container cover portion 21*a* accommodating the ink container 34, and the paper feed cassette 40 that includes the cassette front opening 41 configured such that the printing medium M is viewable and accommodates the printing medium M. The ink container cover portion 21*a* includes the lighting window 27 that takes in light from outside the cover body 21 and the cover portion opening 29 that faces the paper feed cassette 40. The light path 63 through which the light taken in through the lighting window 27 passes is provided inside the ink container cover portion 21*a*. The paper feed cassette 40 includes the cassette side opening 42 facing the cover portion opening 29. The light path 63 communicates with the cassette side opening 42 through the cover portion opening 29. The light taken in through the lighting window 27 makes it easier for the user to view the printing medium M accommodated in the paper feed cassette 40 through the cassette front opening 41. Since the ink L in the ink container 34 can be easily viewed by the external light, the printer 100 is cost-saving and power efficient.

The printer 100 includes the second reflecting plate 65*b* that is provided in the light path 63 and reflects light. The second reflecting plate 65*b* reflects light to the cover portion opening 29. Since the second reflecting plate 65*b* is provided, the amount of light incident on the paper feed cassette 40 increases, which makes it easier for the user to view the printing medium M accommodated in the paper feed cassette 40.

Figure 11:
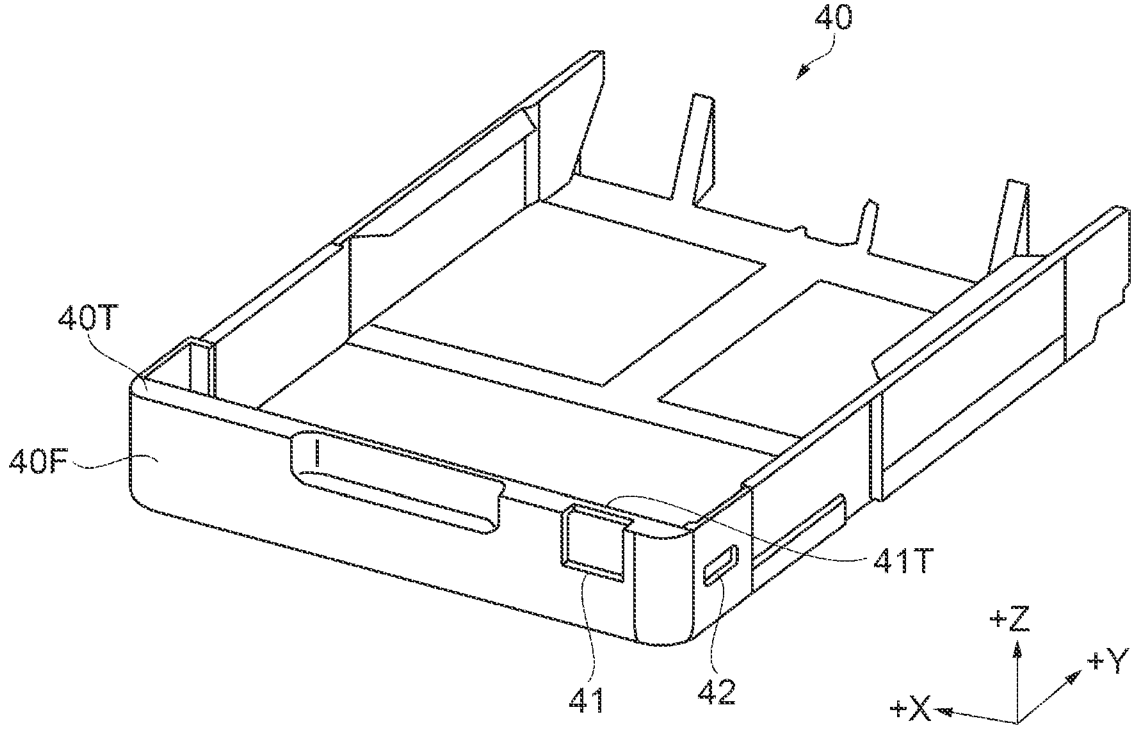
FIG. 11 is a view illustrating a schematic configuration of the paper feed cassette.

The cassette front opening 41 may extend to the cassette top surface 40T. FIG. 11 illustrates a schematic configuration of the paper feed cassette 40. The paper feed cassette 40 illustrated in FIG. 11 includes the cassette front opening 41 extending to the cassette top surface 40T.

When the paper feed cassette 40 is mounted on the printer 100, the region of the cassette top surface 40T that is coupled to the cassette front surface 40F is arranged at a position that can be viewed by the user. A top surface opening 41T that communicates with the cassette front opening 41 formed in the cassette front surface 40F is formed in the cassette top surface 40T illustrated in FIG. 11. The top surface opening 41T constitutes a part of the cassette front opening 41. The cassette top surface 40T corresponds to an example of a second surface.

The paper feed cassette 40 includes the cassette front surface 40F disposed in a direction in which the paper feed cassette 40 is pulled out and the cassette top surface 40T included in an upper surface. The cassette front opening 41 is provided in the cassette front surface 40F and the cassette top surface 40T. Since the cassette front opening 41 is provided in the cassette front surface 40F and the cassette top surface 40T, it becomes easier for the user to view the printing medium M accommodated in the paper feed cassette 40. In addition, since the external light can be taken in through the top surface opening 41T, it becomes easier for the user to view the printing medium M accommodated in the paper feed cassette 40.

Figure 12:
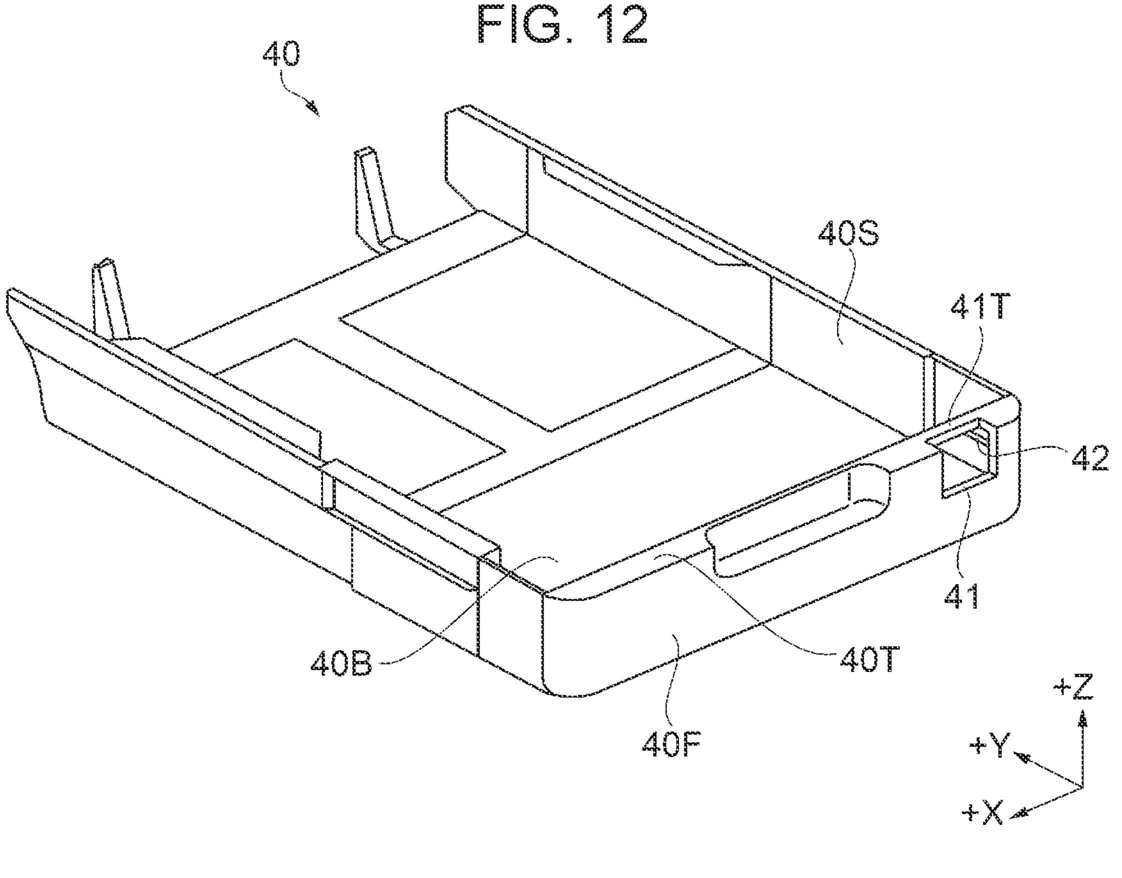
FIG. 12 is a view illustrating a schematic configuration of the paper feed cassette.

An inner surface of the paper feed cassette 40 is preferably surface-treated. FIG. 12 illustrates a schematic configuration of the paper feed cassette 40. FIG. 12 illustrates the cassette front surface 40F, the cassette top surface 40T, a cassette bottom surface 40B, the cassette side surface 40S, the cassette front opening 41, and the cassette side opening 42. FIG. 12 illustrates an inner surface of the cassette side surface 40S that is adjacent to the ink container cover portion 21*a* inside the paper feed cassette 40.

The printing medium M is mounted on the cassette bottom surface 40B. The printing media M of various sizes are mounted on the cassette bottom surface 40B. The cassette bottom surface 40B may include a guide member that guides the printing medium M to an end surface position. The guide member is not illustrated.

Inner surfaces of the cassette bottom surface 40B, the cassette front surface 40F, and the cassette side surface 40S inside the paper feed cassette 40 constitute a cassette inner peripheral surface. The cassette inner peripheral surface corresponds to an example of an inner surface of the medium accommodation portion. At least a part of the cassette inner peripheral surface is preferably subjected to mirror-finishing as a surface treatment. Since the mirror-finishing is performed on at least a part of the cassette inner peripheral surface, the light incident on the paper feed cassette 40 is less likely to be attenuated. As a result, it becomes easier for the user to view the printing medium M accommodated in the paper feed cassette 40.

At least a part of the cassette inner peripheral surface of the paper feed cassette 40 is subjected to mirror-finishing. Since the mirror-finishing is performed on the cassette inner peripheral surface, it becomes easier for the user to view the printing medium M accommodated in the paper feed cassette 40.

The cassette inner peripheral surface may be coated with white paint as the surface treatment. Since the cassette inner peripheral surface is coated with white paint, attenuation of light incident on the paper feed cassette 40 is suppressed. Further, the cassette inner peripheral surface, particularly the cassette bottom surface 40B, may be coated with black paint as the surface treatment. Since the cassette inner peripheral surface is coated with black paint, a color difference between the printing medium M and the cassette inner peripheral surface increases. The contrast makes it easier for the user to view the printing medium M.

Figure 13:
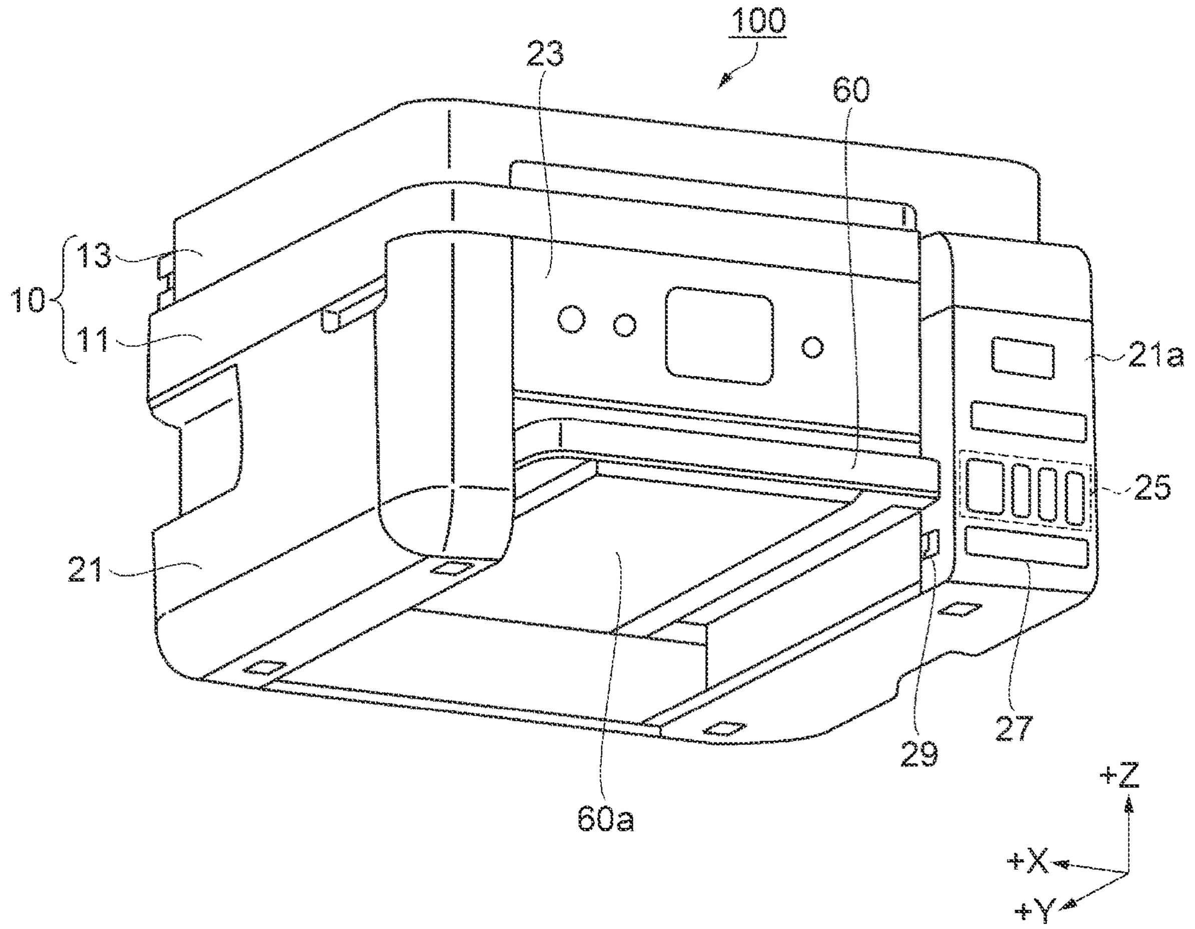
FIG. 13 is a view illustrating a schematic configuration of the printer with the paper feed cassette removed.

A paper discharge tray lower surface 60*a* of the printer 100 may be surface-treated. FIG. 13 illustrates a schematic configuration of the printer 100 with the paper feed cassette 40 removed. FIG. 13 illustrates a schematic configuration of the printer 100 that includes the paper discharge tray lower surface 60*a*.

The paper discharge tray lower surface 60*a* is a −Z-direction surface of the paper discharge tray 60 and faces the paper feed cassette 40. The paper discharge tray lower surface 60*a* faces the printing medium M accommodated in the paper feed cassette 40 at least in a closed state. The paper discharge tray lower surface 60*a* constitutes a part of the cassette inner peripheral surface at least in the closed state. The paper discharge tray lower surface 60*a* may be surface-treated.

The paper discharge tray lower surface 60*a* is preferably subjected to mirror-finishing as the surface treatment. Since the mirror-finishing is performed on the paper discharge tray lower surface 60*a*, the light incident on the paper feed cassette 40 is less likely to be attenuated. As a result, it becomes easier for the user to view the printing medium M accommodated in the paper feed cassette 40.

The paper discharge tray lower surface 60*a* may be coated with white paint for the surface treatment. Since the paper discharge tray lower surface 60*a* is coated with white paint, attenuation of light incident on the paper feed cassette 40 is suppressed.

A bottom cover portion that is a part of the cover body 21 may be provided between the paper discharge tray 60 and the paper feed cassette 40. In this case, a lower surface of the bottom cover portion faces the printing medium M accommodated in the paper feed cassette 40. Further, the lower surface of the bottom cover portion constitutes a part of the cassette inner peripheral surface. At this time, the lower surface of the bottom surface cover portion may be surface-treated.

The bottom cover portion may be subjected to mirror-finishing or coated with white paint as the surface treatment. These surface treatments also provide the same effect as that obtained when the surface treatment is performed on the paper discharge tray lower surface 60*a*.

Figure 14:
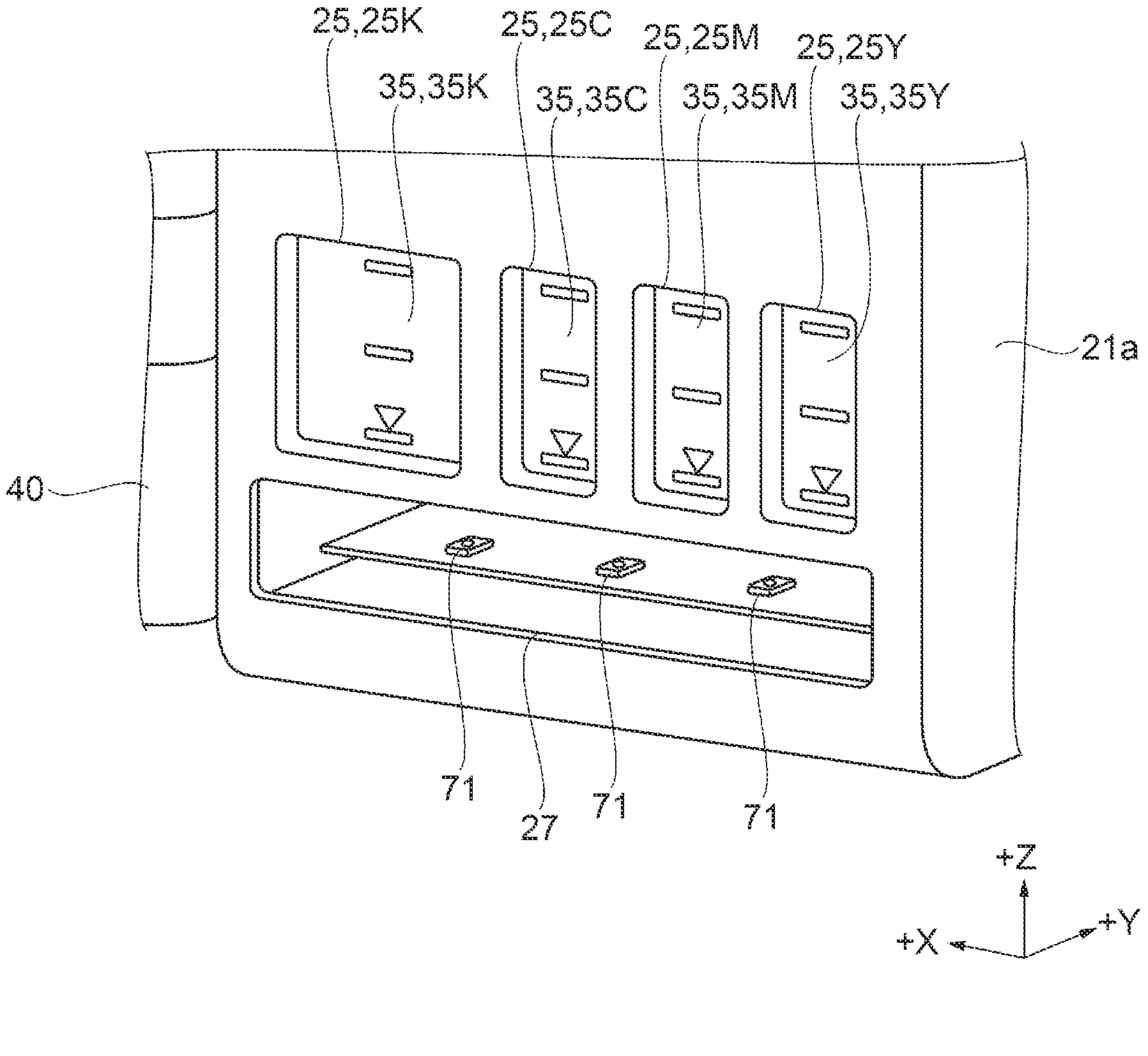
FIG. 14 is a view illustrating a configuration in which a light emitting diode (LED) is provided in a light path.

A light source that emits light may be provided in the light path 63. FIG. 14 illustrates a configuration in which the light source is provided in the light path 63. FIG. 14 illustrates a configuration in which a light emitting diode (LED) 71 is provided in the light path 63. The LED 71 is an example of the light source and corresponds to an example of an illumination portion.

FIG. 14 illustrates a configuration in which the LED 71 is provided in the light path 63 continuous to the lighting window 27. The LED 71 illuminates the light path 63 formed inside the ink container cover portion 21*a*. The LED 71 illuminates the light path 63 between the ink container cover portion 21*a* and the ink container 34. The LED 71 illuminates the ink amount indicating portion 35 of the ink container 34. In FIG. 14, three LEDs 71 are arranged in the light path 63. The three LEDs 71 are arranged along the X axis. The number of LEDs 71 is not limited to three. One or more LEDs 71 may be arranged in the light path 63. The position of the LED 71 is not limited to the position of LED 71 illustrated in FIG. 14. The LED 71 is preferably arranged at a position where the ink amount indicating portion 35 viewed through the ink amount checking window 25 can be easily viewed by the user. The LED 71 is preferably arranged at a position where the printing medium M viewed through the cassette front opening 41 can be easily viewed by the user.

A light bulb (not illustrated) may be provided in the light path 63 continuous to the lighting window 27 instead of the LED 71. The light bulb illuminates the light path 63 formed inside the ink container cover portion 21*a*. The light bulb illuminates the light path 63 between the ink container cover portion 21*a* and the ink container 34. The light bulb illuminates the ink amount indicating portion 35 of the ink container 34. The number of light bulbs is not limited to one. A plurality of light bulbs may be arranged in the light path 63. The position of the light bulb is not limited to the position of the LED 71 illustrated in FIG. 14. The light bulb is preferably arranged at a position where the ink amount indicating portion 35 viewed through the ink amount checking window 25 can be easily viewed by the user. The light bulb is preferably arranged at a position where the printing medium M viewed through the cassette front opening 41 can be easily viewed by the user. The light bulb corresponds to an example of the illumination portion.

As described above, the printer 100 preferably includes the light source that is provided in the light path 63 and emits light. Since the light source is provided in the light path 63, the user can easily view the amount of ink stored in the ink container 34. Further, it becomes easier for the user to view the printing medium M accommodated in the paper feed cassette 40.

Figure 15:
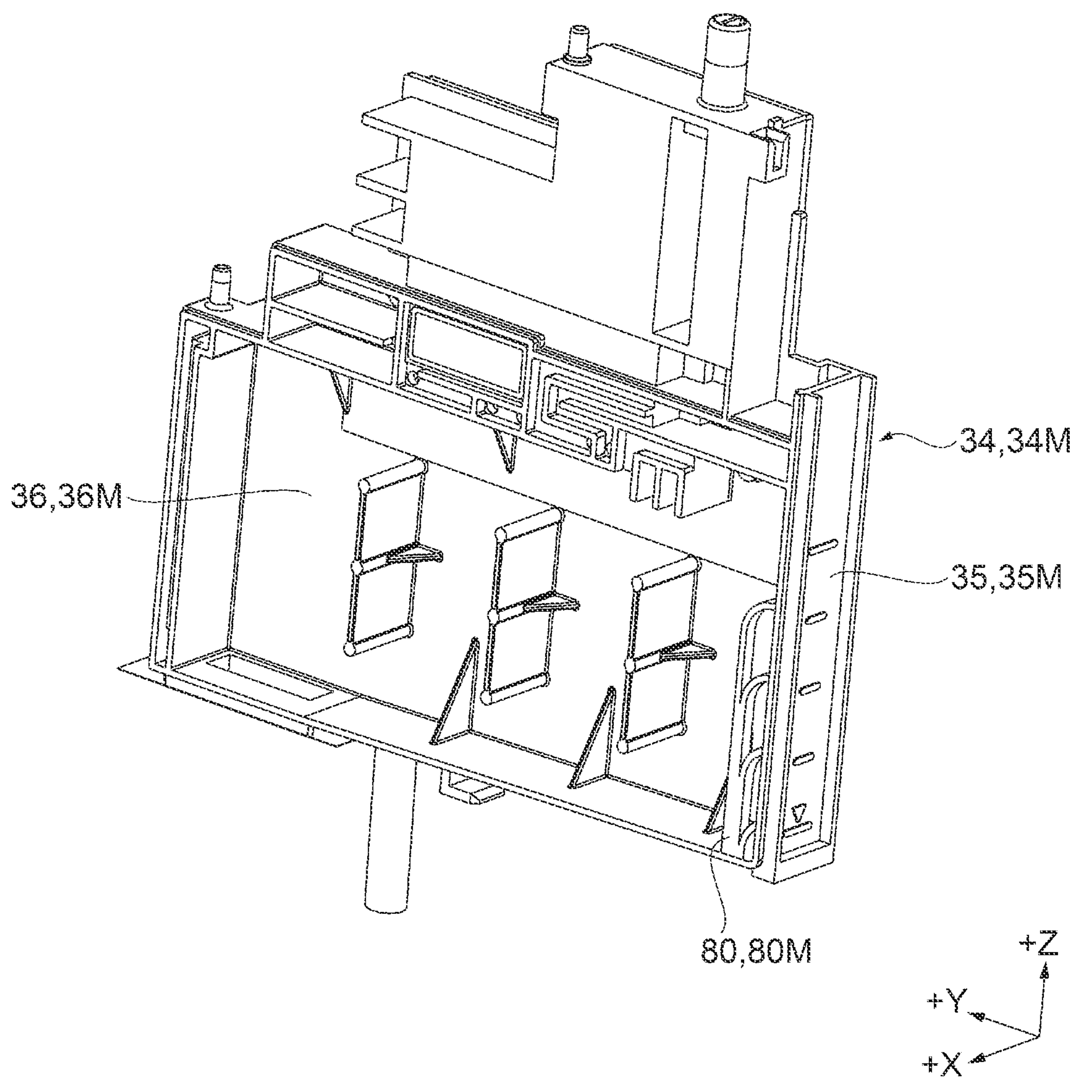
FIG. 15 is a view illustrating the ink container including a light guide member.
Figure 16:
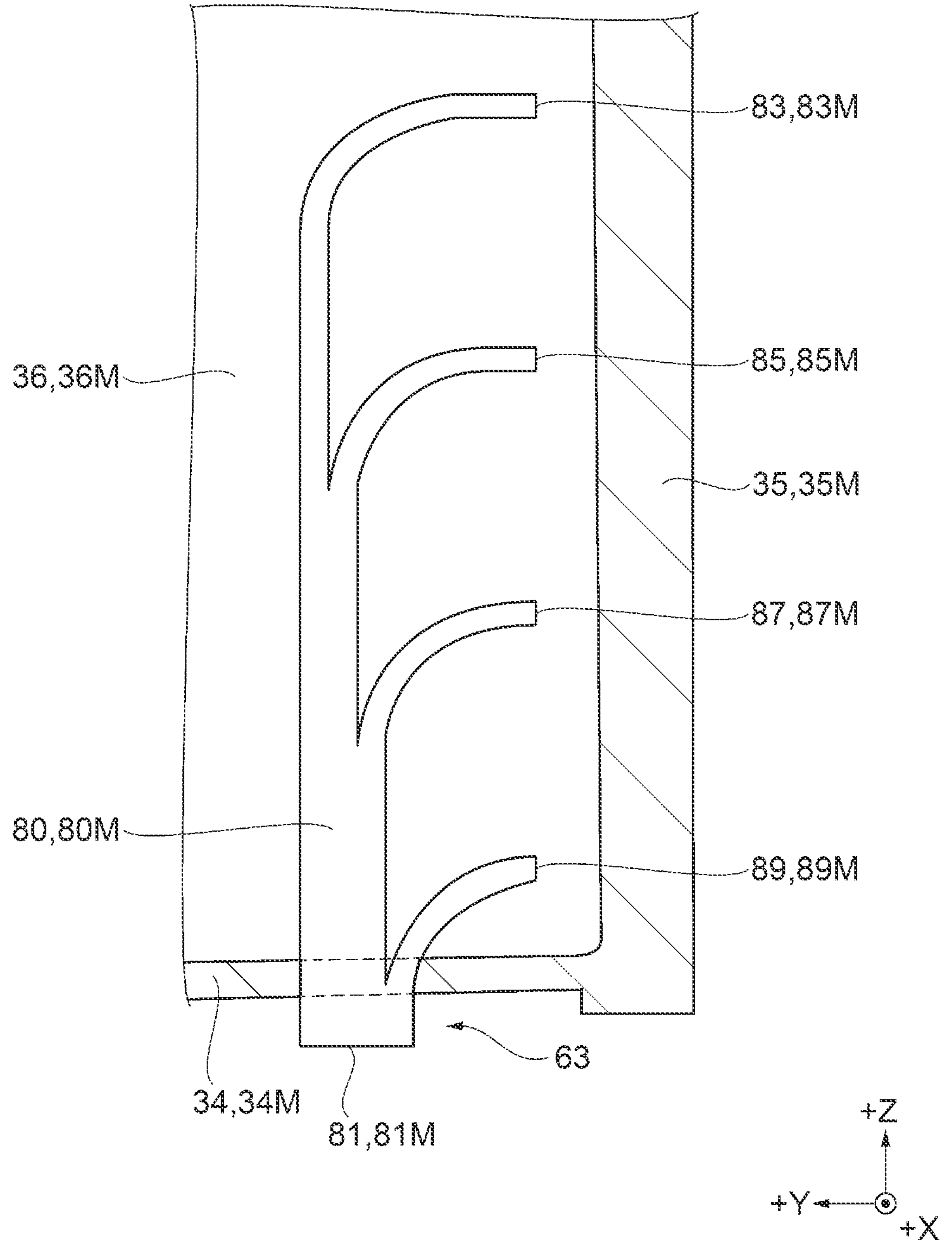
FIG. 16 is a view illustrating a schematic configuration of the light guide member.

The printer 100 may include a light guide member 80 that guides light to the ink container 34. FIGS. 15 and 16 illustrate a configuration of the light guide member 80. FIGS. 17, 18, 19, 20, 21, and 22 illustrate a relationship between the amount of ink stored in the ink container 34 and the light guide member 80. The light guide member 80 corresponds to an example of a light guide portion.

FIG. 15 illustrates the ink container 34 including the light guide member 80. FIG. 15 illustrates the magenta ink container 34M as an example of the ink container 34. The black ink container 34K, the cyan ink container 34C, and the yellow ink container 34Y may have the same configuration as the magenta ink container 34M illustrated in FIG. 15.

The ink container 34 illustrated in FIG. 15 includes the light guide member 80. The light guide member 80 is provided inside the light path 63 and the ink container 34. The light guide member 80 is provided at a position on a +Y-direction side of the ink amount indicating portion 35. The light guide member 80 is provided inside the ink storage chamber 36. The magenta ink container 34M, which is an example of the ink container 34, includes a magenta ink light guide member 80M. The magenta ink light guide member 80M is provided inside the light path 63 and the magenta ink container 34M. The magenta ink light guide member 80M is provided at a position on a +Y-direction side of the magenta ink amount indicating portion 35M. The magenta ink light guide member 80M is provided inside a magenta ink storage chamber 36M. Note that the light guide member 80 may be provided only inside the ink container 34.

FIG. 16 illustrates a schematic configuration of the light guide member 80. One end of the light guide member 80 is provided in the light path 63. The other end of the light guide member 80 is provided inside the ink storage chamber 36 of the ink container 34. The light guide member 80 includes a light entrance portion 81, a first light emission portion 83, a second light emission portion 85, a third light emission portion 87, and a fourth light emission portion 89. The light guide member 80 illustrated in FIG. 16 includes four light emission portions, but is not limited thereto. It is sufficient if the light guide member 80 includes one or more light emission portions. One or more light emission portions are provided at positions spaced apart from the ink amount indicating portion 35. One end of the magenta ink light guide member 80M, which is an example of the light guide member 80, is provided in the light path 63. The other end of the magenta ink light guide member 80M is provided inside the magenta ink storage chamber 36M of the magenta ink container 34M. The magenta ink light guide member 80M includes a magenta ink light entrance portion 81M, a magenta ink first light emission portion 83M, a magenta ink second light emission portion 85M, a magenta ink third light emission portion 87M, and a magenta ink fourth light emission portion 89M. The configuration of the magenta ink light guide member 80M is the same as the configuration of the light guide member 80, and details thereof are described in the description of the light guide member 80.

Light enters the inside of the light guide member 80 through the light entrance portion 81. The light entrance portion 81 constitutes one end of the light guide member 80. The light entrance portion 81 is arranged at a lower end of the light guide member 80 in the −Z direction. The light entrance portion 81 is provided in the light path 63. The light passing through the light path 63 enters the light guide member 80 through the light entrance portion 81.

The first light emission portion 83 emits the light that has entered through the light entrance portion 81. The first light emission portion 83 constitutes the other end of the light guide member 80. The first light emission portion 83 is provided above the light entrance portion 81. The first light emission portion 83 is provided at the top of the plurality of light emission portions. The first light emission portion 83 faces the ink amount indicating portion 35.

The second light emission portion 85 emits the light that has entered through the light entrance portion 81. The second light emission portion 85 is provided below the first light emission portion 83. The second light emission portion 85 is provided above the light entrance portion 81. The second light emission portion 85 is provided at a position along the Z axis between the first light emission portion 83 and the light entrance portion 81. The second light emission portion 85 faces the ink amount indicating portion 35.

The third light emission portion 87 emits the light that has entered through the light entrance portion 81. The third light emission portion 87 is provided below the second light emission portion 85. The third light emission portion 87 is provided above the light entrance portion 81. The third light emission portion 87 is provided at a position along the Z axis between the second light emission portion 85 and the light entrance portion 81. The third light emission portion 87 faces the ink amount indicating portion 35.

The fourth light emission portion 89 emits the light that has entered through the light entrance portion 81. The fourth light emission portion 89 is provided below the third light emission portion 87. The fourth light emission portion 89 is provided above the light entrance portion 81. The fourth light emission portion 89 is provided at a position along the Z axis between the third light emission portion 87 and the light entrance portion 81. The fourth light emission portion 89 faces the ink amount indicating portion 35.

Figure 17:
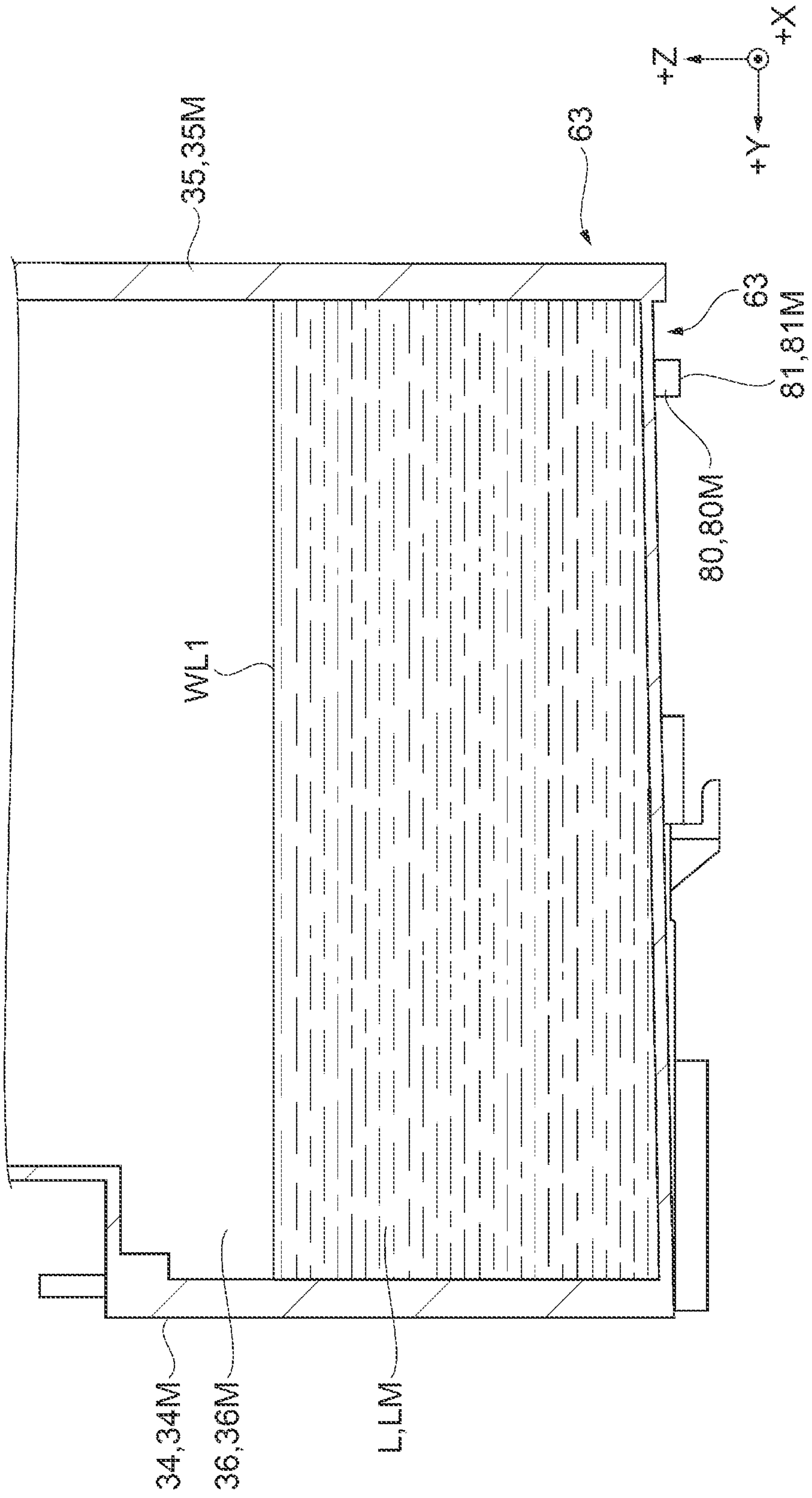
FIG. 17 is a view illustrating a Y-Z section of the ink container in which ink is stored at a first water level.
Figure 18:
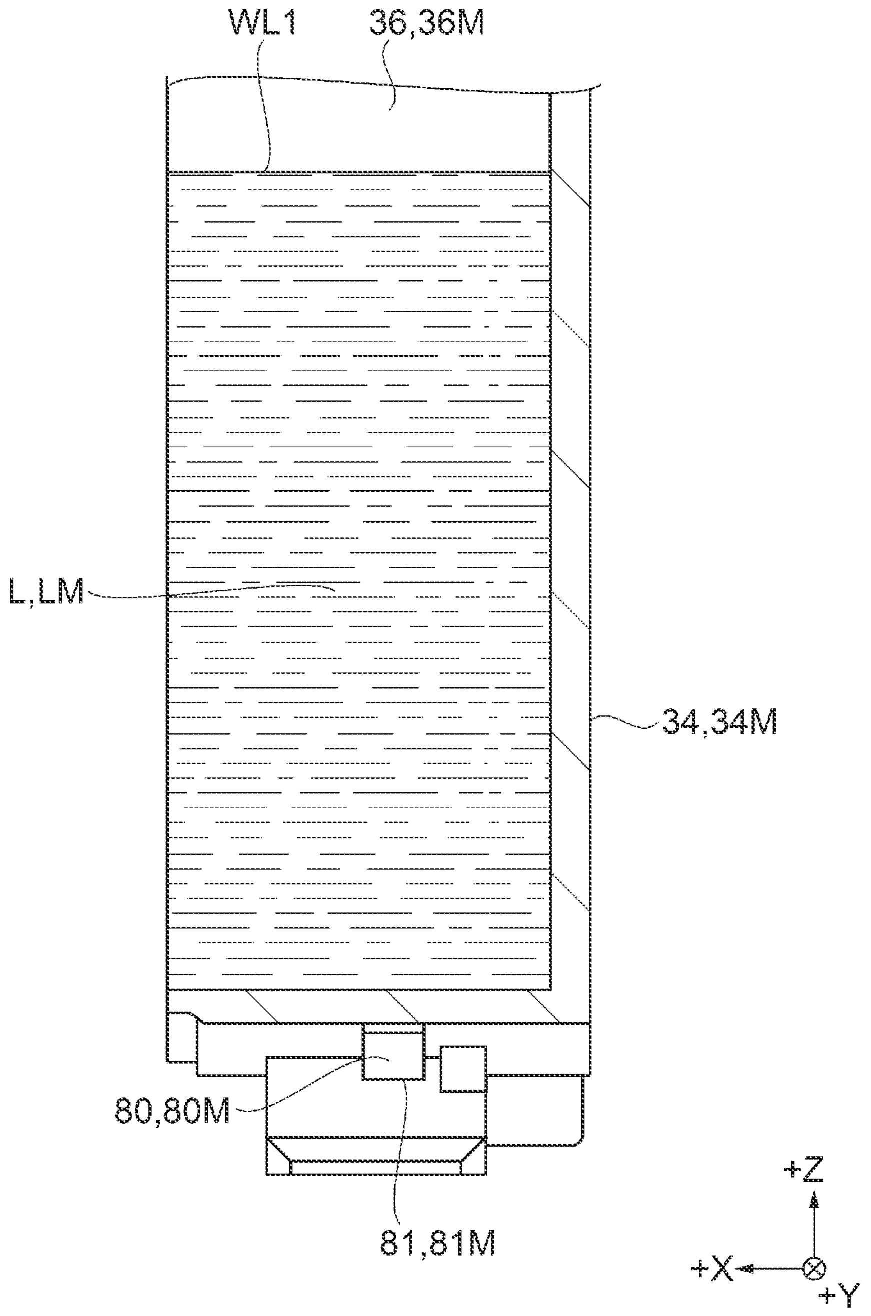
FIG. 18 is a view illustrating an X-Z section of the ink container in which the ink is stored at the first water level.

FIGS. 17 and 18 illustrate the ink container 34 in which the ink L is stored at a first water level WL1. FIG. 17 illustrates a Y-Z section of the ink container 34 in which the ink L is stored at the first water level WL1. FIG. 18 illustrates an X-Z section of the ink container 34 in which the ink L is stored at the first water level WL1. FIG. 18 illustrates an X-Z section between the ink amount indicating portion 35 and the light guide member 80. FIGS. 17 and 18 illustrate the magenta ink container 34M that stores the magenta ink LM which is an example of the ink L. Details are described in the description of the ink container 34 and the light guide member 80.

As illustrated in FIGS. 17 and 18, in the ink container 34, the ink L is stored at the first water level WL1. The first water level WL1 is, for example, a water level when the maximum amount of ink L is stored in the ink container 34. When the ink L is stored at the first water level WL1 in the ink container 34, the first light emission portion 83, the second light emission portion 85, the third light emission portion 87, and the fourth light emission portion 89 of the light guide member 80 are positioned in the ink L. The light emitted by the first light emission portion 83, the second light emission portion 85, the third light emission portion 87, and the fourth light emission portion 89 does not reach the ink amount indicating portion 35 due to the stored ink L. Alternatively, even when the light emitted by the first light emission portion 83, the second light emission portion 85, the third light emission portion 87, and the fourth light emission portion 89 reaches the ink amount indicating portion 35, the amount of light is smaller than that when there is no ink L. The user cannot view the light emitted by the first light emission portion 83, the second light emission portion 85, the third light emission portion 87 and the fourth light emission portion 89. Alternatively, it is difficult for the user to view the light emitted by the first light emission portion 83, the second light emission portion 85, the third light emission portion 87, and the fourth light emission portion 89. The user can confirm that the water level of the ink L stored in the ink container 34 is the first water level WL1 by viewing the ink amount indicating portion 35.

Figure 19:
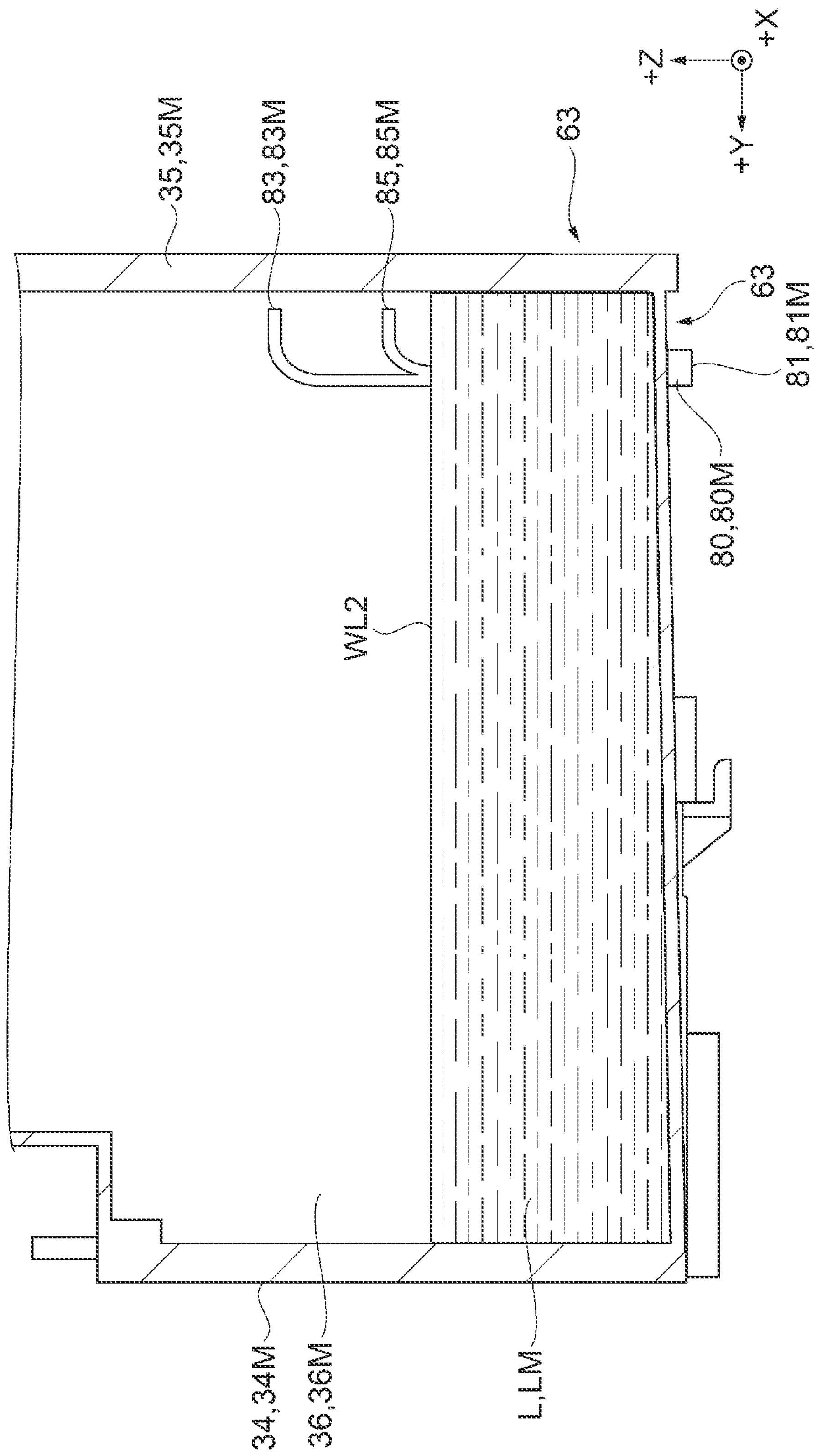
FIG. 19 is a view illustrating a Y-Z section of the ink container in which the ink is stored at a second water level.
Figure 20:
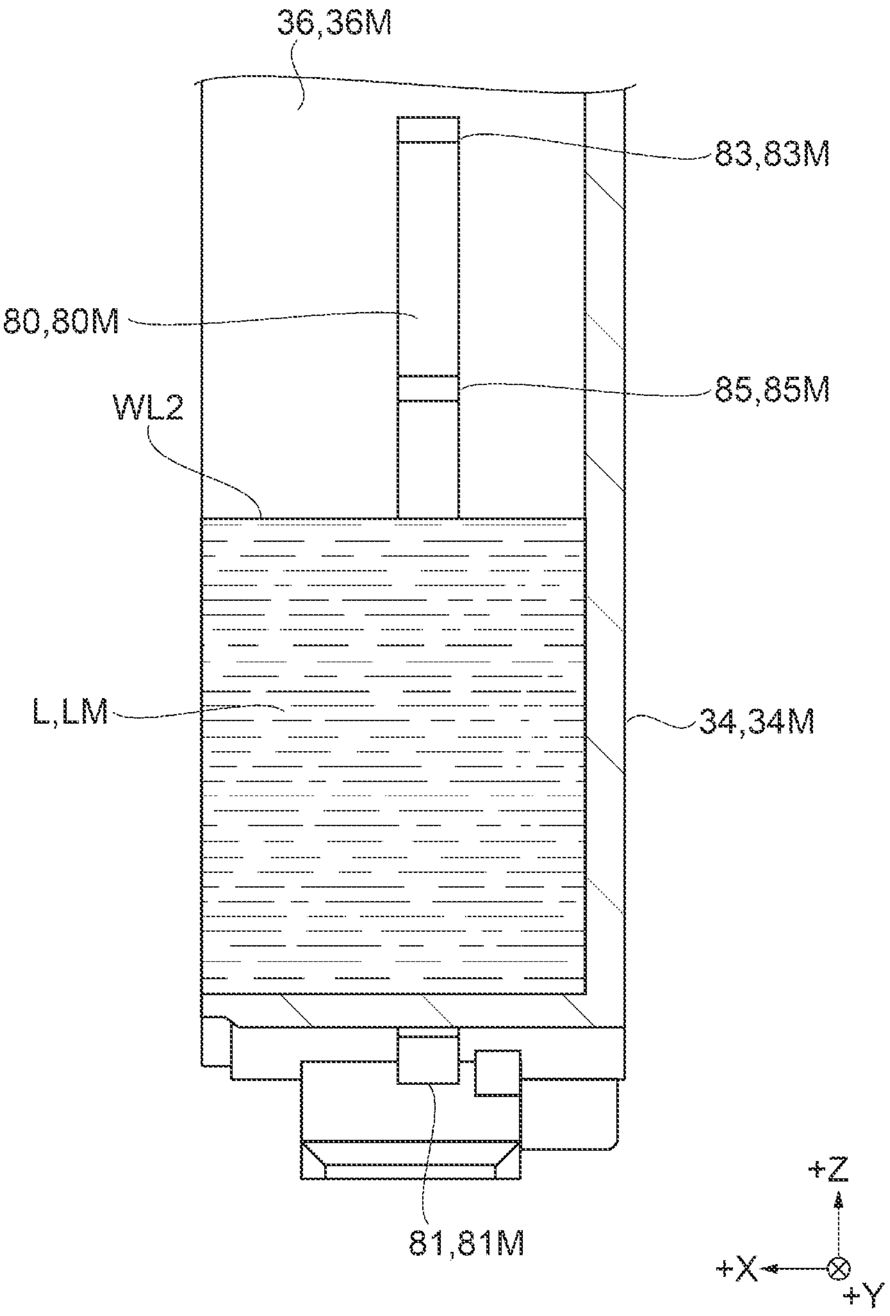
FIG. 20 is a view illustrating an X-Z section of the ink container in which the ink is stored at the second water level.

FIGS. 19 and 20 illustrate the ink container 34 in which the ink L is stored at a second water level WL2. FIG. 19 illustrates a Y-Z section of the ink container 34 in which the ink L is stored at the second water level WL2. The second water level WL2 is, for example, a water level when a half of the maximum amount of ink L is stored in the ink container 34. FIG. 20 illustrates an X-Z section of the ink container 34 in which the ink L is stored at the second water level WL2. FIG. 20 illustrates an X-Z section between the ink amount indicating portion 35 and the light guide member 80. FIGS. 19 and 20 illustrate the magenta ink container 34M that stores the magenta ink LM which is an example of the ink L. Details are described in the description of the ink container 34 and the light guide member 80.

As illustrated in FIGS. 19 and 20, in the ink container 34, the ink L is stored at the second water level WL2. When the ink L is stored at the second water level WL2 in the ink container 34, the first light emission portion 83 and the second light emission portion 85 of the light guide member 80 are positioned above the second water level WL2. The first light emission portion 83 and the second light emission portion 85 are exposed. The third light emission portion 87 and the fourth light emission portion 89 are positioned within the ink L. The light emitted by the first light emission portion 83 and the second light emission portion 85 can be viewed through the ink amount indicating portion 35. The light emitted by the third light emission portion 87 and the fourth light emission portion 89 does not reach the ink amount indicating portion 35 due to the stored ink L. Alternatively, even when the light emitted by the third light emission portion 87 and the fourth light emission portion 89 reaches the ink amount indicating portion 35, the amount of light is smaller than that when there is no ink L. The user can view the light emitted by the first light emission portion 83 and the second light emission portion 85. The user cannot view the light emitted by the third light emission portion 87 and the fourth light emission portion 89. Alternatively, it is difficult for the user to view the light emitted by the third light emission portion 87 and the fourth light emission portion 89. The user can confirm that the water level of the ink L stored in the ink container 34 is the second water level WL2 by viewing the ink amount indicating portion 35.

Figure 21:
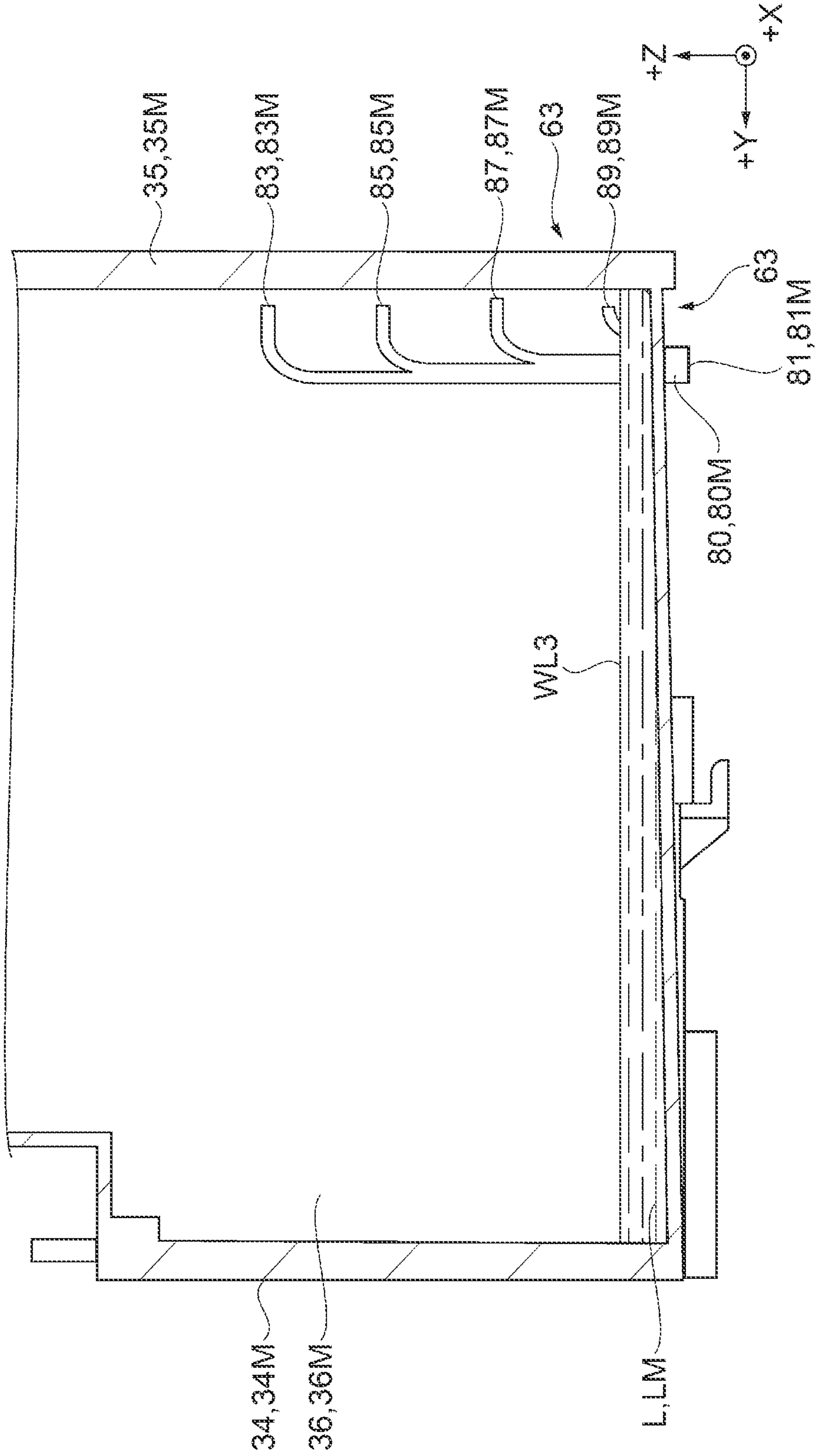
FIG. 21 is a view illustrating a Y-Z section of the ink container in which the ink is stored at a third water level.
Figure 22:
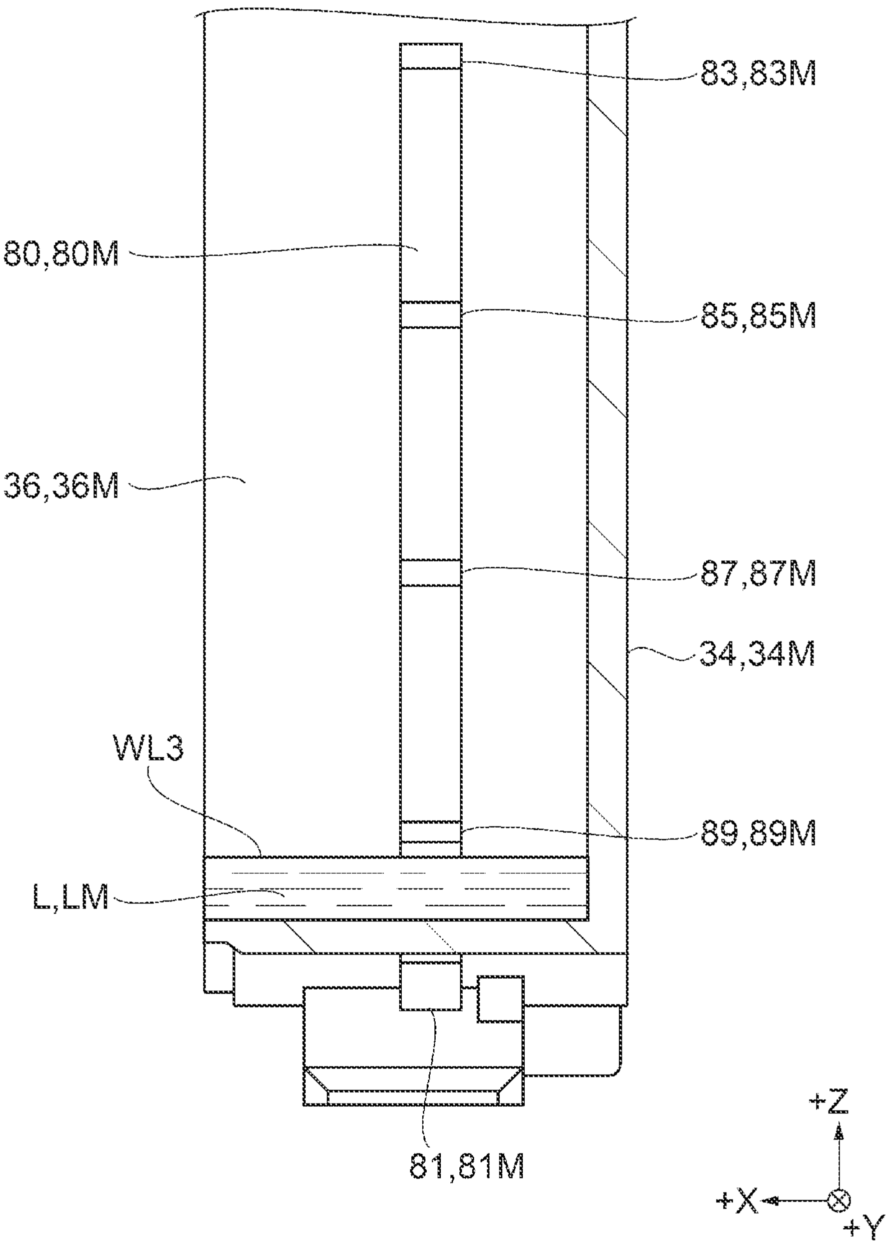
FIG. 22 is a view illustrating an X-Z section of the ink container in which the ink is stored at the third water level.

FIGS. 21 and 22 illustrate the ink container 34 in which the ink L is stored at a third water level WL3. FIG. 21 illustrates a Y-Z section of the ink container 34 in which the ink L is stored at the third water level WL3. The third water level WL3 is, for example, a water level when replenishing with the ink L is necessary. FIG. 22 illustrates an X-Z section of the ink container 34 in which the ink L is stored at the third water level WL3. FIG. 22 illustrates an X-Z section between the ink amount indicating portion 35 and the light guide member 80. FIGS. 21 and 22 illustrate the magenta ink container 34M that stores the magenta ink LM which is an example of the ink L. Details are described in the description of the ink container 34 and the light guide member 80.

As illustrated in FIGS. 21 and 22, in the ink container 34, the ink L is stored at the third water level WL3. When the ink L is stored at the third water level WL3 in the ink container 34, the first light emission portion 83, the second light emission portion 85, the third light emission portion 87, and the fourth light emission portion 89 of the light guide member 80 are positioned below the third water level WL3. The light emitted by the first light emission portion 83, the second light emission portion 85, the third light emission portion 87, and the fourth light emission portion 89 can be viewed through the ink amount indicating portion 35. The user can view the light emitted by the first light emission portion 83, the second light emission portion 85, the third light emission portion 87 and the fourth light emission portion 89. The user can confirm that the water level of the ink L stored in the ink container 34 is the third water level WL3 by viewing the ink amount indicating portion 35. When the amount of ink L at the third water level WL3 is set to a predetermined ink near-end amount or an ink end amount, the user can confirm that replenishing with the ink L is necessary.

The printer 100 preferably includes the light guide member 80 that guides light to the ink container 34. The user can confirm the water level of the ink L stored in the ink container 34 by viewing the ink amount indicating portion 35.

The light emission portion of the light guide member 80 may be in contact with the ink amount indicating portion 35 instead of being spaced apart from the ink amount indicating portion 35. With such a configuration, it is possible to check the light emission portion regardless of the amount of ink. Further, the light guide member 80 may be provided at a position on a −Y-direction side of the ink amount indicating portion 35. That is, the light guide member 80 may be provided outside the ink container 34. With such a configuration, it is possible to clearly view the light from the light emission portion.

What is claimed is:

1. A recording apparatus comprising:

a recording portion that performs recording by ejecting a liquid onto a medium;

a liquid accommodation portion that accommodates the liquid to be ejected by the recording portion; and a housing that includes an accommodation portion exterior that accommodates the liquid accommodation portion, wherein the liquid accommodation portion includes a viewing region configured that the liquid accommodated is viewed, the accommodation portion exterior of the housing includes a viewing portion that faces the viewing region and is configured that the liquid is viewed, and a lighting portion that takes in light from outside the housing, and an optical path, through which the light taken in passes, is provided between the liquid accommodation portion and the accommodation portion exterior, wherein the optical path includes a continuous void that extends from the lighting portion through a region sandwiched between the viewing portion and the viewing region.

2. The recording apparatus according to claim 1, wherein the lighting portion is provided below the viewing portion.

3. The recording apparatus according to claim 2, wherein the liquid accommodation portion includes a gas-liquid exchange portion that performs gas-liquid exchange, and a storage portion configured to accommodate the liquid flowing out from the gas-liquid exchange portion, and the lighting portion is provided at a position in the accommodation portion exterior, the position facing the storage portion.

4. The recording apparatus according to claim 1, further comprising a reflecting portion that is provided in the optical path and reflects the light, wherein the reflecting portion reflects the light to the viewing region.

5. The recording apparatus according to claim 1, further comprising an illumination portion that is provided in the optical path and emits light.

6. The recording apparatus according to claim 1, further comprising a light guide portion that guides the light to the liquid accommodation portion.

7. The recording apparatus according to claim 2, further comprising a second liquid accommodation portion that accommodates a second liquid, wherein the second liquid accommodation portion includes a second viewing region configured that the accommodated second liquid is viewed, the viewing portion includes a first region that faces the viewing region and a second region that faces the second viewing region, and the lighting portion is provided below the first region and the second region.

8. The recording apparatus according to claim 1, further comprising a medium accommodation portion that accommodates the medium, wherein the accommodation portion exterior includes an exterior opening that faces the medium accommodation portion, the medium accommodation portion includes a member opening that faces the exterior opening, and a medium viewing portion configured that the accommodated medium is viewed, and the optical path communicates with the member opening through the exterior opening.

9. A recording apparatus comprising:

a recording portion that performs recording by ejecting a liquid onto a medium;

a liquid accommodation portion that accommodates the liquid to be ejected by the recording portion;

a housing that includes an accommodation portion exterior that accommodates the liquid accommodation portion; and a medium accommodation portion that includes a medium viewing portion configured that the medium is viewed and that accommodates the medium, wherein the accommodation portion exterior includes a lighting portion that takes in light from outside the housing and an exterior opening that faces the medium accommodation portion, an optical path, through which the light taken in through the lighting portion passes, is provided inside the accommodation portion exterior, the medium accommodation portion includes a member opening that faces the exterior opening, and the optical path communicates with the member opening through the exterior opening.

10. The recording apparatus according to claim 9, further comprising a reflecting portion that is provided in the optical path and reflects the light, wherein the reflecting portion reflects the light to the exterior opening.

11. The recording apparatus according to claim 9, wherein the medium accommodation portion includes a first surface disposed in a direction in which the medium accommodation portion is pulled out and a second surface included in an upper surface, and the medium viewing portion is provided in the first surface and the second surface.

12. The recording apparatus according to claim 9, wherein the lighting portion and the medium viewing portion overlap each other in a vertical direction when viewed from a position facing the exterior opening.

13. The recording apparatus according to claim 9, wherein at least a part of an inner surface of the medium accommodation portion is mirror-finished.

14. The recording apparatus according to claim 9, wherein the liquid accommodation portion includes a gas-liquid exchange portion that performs gas-liquid exchange, and a storage portion that is configured to accommodate the liquid flowing out from the gas-liquid exchange portion, and the lighting portion is provided at a position in the accommodation portion exterior, the position facing the storage portion.

* * * * *